United States Patent
Paredes Cabrera

(10) Patent No.: US 12,356,364 B2
(45) Date of Patent: Jul. 8, 2025

(54) ARTIFICIAL INTELLIGENCE (AI) FOR COMMUNICATION NETWORKS

(71) Applicant: Telefonaktiebolaget LM Ericsson (publ), Stockholm (SE)

(72) Inventor: Ricardo Paredes Cabrera, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 449 days.

(21) Appl. No.: 17/768,938

(22) PCT Filed: Oct. 16, 2019

(86) PCT No.: PCT/IB2019/058837
§ 371 (c)(1),
(2) Date: Apr. 14, 2022

(87) PCT Pub. No.: WO2021/074673
PCT Pub. Date: Apr. 22, 2021

(65) Prior Publication Data
US 2023/0140473 A1    May 4, 2023

(51) Int. Cl.
*H04W 64/00*    (2009.01)
*H04W 68/00*    (2009.01)
H04W 36/32    (2009.01)

(52) U.S. Cl.
CPC ......... *H04W 64/006* (2013.01); *H04W 68/00* (2013.01); *H04W 36/322* (2023.05)

(58) Field of Classification Search
CPC . H04W 64/006; H04W 68/00; H04W 36/322; H04W 36/008375; H04W 16/08; H04W 68/04
See application file for complete search history.

(56) References Cited

U.S. PATENT DOCUMENTS

| | | | |
|---|---|---|---|
| 9,615,358 B2 | 4/2017 | Nguyen et al. | |
| 10,104,504 B2 * | 10/2018 | Mahajan | H04W 4/025 |
| 10,129,903 B2 | 11/2018 | Khoryaev et al. | |
| 2004/0236649 A1 | 11/2004 | Yip et al. | |
| 2014/0095617 A1 * | 4/2014 | Chan | G06F 16/125 |
| | | | 709/204 |
| 2014/0128057 A1 * | 5/2014 | Siomina | H04W 56/00 |
| | | | 455/423 |

(Continued)

FOREIGN PATENT DOCUMENTS

CN    103621159 A    3/2014

OTHER PUBLICATIONS

Chinese Office Action and English language summary translation of the Chinese Office Action dated Oct. 25, 2023 issued in Application No. 201980103043.3, consisting of 12 pages.

(Continued)

*Primary Examiner* — Kabir A Timory
(74) *Attorney, Agent, or Firm* — Weisberg I.P. Law, P.A.

(57) ABSTRACT

A method and apparatus are provided for artificial intelligence (AI) for communication networks. In one embodiment, a method implemented in a core network node includes collecting location information, the collected location information associated with movement of at least one user equipment within a network; predicting based at least part of the collected location information; and communicating an indication of the prediction.

16 Claims, 18 Drawing Sheets

Probability of UEs moving from cell i to cell k

Example:
Number of UEs prediction for $t_1$, where t can be in any time units, such as minutes, hours, days, etc.
10% probability = ($t_1$, 0.1) = 90
20% probability = ($t_1$, 0.2) = 70
90% probability = ($t_1$, 0.9) = 40

(56) References Cited

U.S. PATENT DOCUMENTS

| | | | |
|---|---|---|---|
| 2014/0355566 A1 | 12/2014 | Walley et al. | |
| 2015/0271727 A1 | 9/2015 | Harrang | |
| 2016/0127754 A1* | 5/2016 | Lee ................. | H04N 21/23805 |
| | | | 725/62 |

OTHER PUBLICATIONS

International Search Report and Written Opinion of the International Searching Authority dated Dec. 20, 2019 Issued in PCT Application No. PCT/IB2019/058837, consisting of 15 pages.

3GPP TSG-RAN WG2 Meeting #100; R2-1713746 (Resubmission of R2-1710979); Source: ASTRI, TCL Communication Ltd.; Title: Discussion on downlink overhead reduction for NR paging; Agenda Item: 10.4.4.6; Document for: Discussion, Decision, Reno, USA, Nov. 27-Dec. 1, 2017, consisting of 5 pages.

Soteriou et al: "Exploring the Design Space of Self-Regulating Power-Aware On/Off Interconnection Networks", IEEE Transactions on Parallel and Distributed Systems, vol. 18, No. 3, Mar. 2007, consisting of 16 pages.

Domanski et al: "Memory-BasedPrediction of District Heating Temperature Using GPGPU", Institute of Control and Computational Engineering, Warsaw University of Technology, Warszawa, Poland, Mar. 23, 2015, consisting of 10 pages.

3GPP TS 38.413 V15.5.0 (Sep. 2019) 3rd Generation Partnership Project; Technical Specification Group Radio Access Network; NG-RAN; NG Application Protocol (NGAP) (Release 15), consisting of 329 pages.

* cited by examiner

Example:
Probabilities that UE1 can be found at a different cells and tracking areas at time $t_1$, where t can be in any time units, such as minutes, hours, days, etc.

10% probability = $(t_1, 0.1)$ = TA1/Cell-CGI a
20% probability = $(t_1, 0.2)$ = TA3/ Cell-CGI b
70% probability = $(t_1, 0.7)$ = TA7/ Cell-CGI d
100% probability = $(t_1, 1.00)$ = 0

ARTIFICIAL INTELLIGENCE (AI) FOR COMMUNICATION NETWORKS

CROSS-REFERENCE TO RELATED APPLICATION

This application is a Submission Under 35 U.S.C. § 371 for U.S. National Stage Patent Application of International Application Number: PCT/IB2019/058837, filed Oct. 16, 2019 entitled "ARTIFICIAL INTELLIGENCE (AI) FOR COMMUNICATION NETWORKS," the entirety of which is incorporated herein by reference.

TECHNICAL FIELD

The present disclosure relates to communication networks and, in particular, to artificial intelligence (AI) for communication networks.

BACKGROUND

Communication networks, such as, wireless communication systems, are widely deployed to provide various services, such as, for example, data, messaging, telephony, video streaming, etc. As the demand for mobile broadband continues to increase, techniques to improve the efficiency of the communication networks and/or to enhance the user experience are being considered.

SUMMARY

Some embodiments of the present disclosure advantageously provide methods, apparatuses and systems for artificial intelligence (AI) for communication networks, such as, a Fifth Generation (5G) network.

According to a first aspect of the present disclosure, a method implemented in a core network node is provided. The method includes collecting location information, the collected location information associated with movement of at least one user equipment within a network. The method includes predicting based at least part of the collected location information. The method includes communicating an indication of the prediction.

In some embodiments of this aspect, predicting further includes predicting according to a prediction algorithm, the prediction algorithm associating each of a plurality of different time windows with a different weight. In some embodiments of this aspect, the plurality of different time windows includes at least one a time of day, a day-of-the-week, a week-of-the-year, a month-of-the-year and a season, each time window associated with a different weight in the prediction algorithm. In some embodiments of this aspect, predicting according to the prediction algorithm further includes determining at least one probability based at least in part on a weighted current prediction probability value and a weighted historical probability prediction value. In some embodiments of this aspect, an outcome of a preceding prediction determines a weight value applied to the current probability prediction value and a weight value applied to the historical prediction value. In some embodiments of this aspect, collecting the location information further includes collecting path information and corresponding time information, the path information and the time information indicating the movement of the at least one user equipment between at least two radio network areas in the network.

In some embodiments of this aspect, predicting further includes predicting a movement path of the at least one user equipment relative to the network, the predicting being based at least in part on the collected path information and the time information. In some embodiments of this aspect, communicating the indication further includes communicating the indication of the predicted movement path of the at least one user equipment. In some embodiments of this aspect, the at least two radio network areas include at least two tracking areas and at least two cells. In some embodiments of this aspect, the indication of the predicted movement path includes at least one cell global identifier, CGI, the at least one CGI indicating at least one cell that the at least one user equipment is expected to move to according to the predicted movement path. In some embodiments of this aspect, the predicting further includes determining at least one probability of at least one movement path of the at least one user equipment, the at least one movement path including at least one of a cell and a neighboring cell of a base station. In some embodiments of this aspect, the indication of the predicted movement path is configured to be included in a paging request for the at least one user equipment, the paging request indicating, for at least one cell in the paging request, a probability prediction that the at least one user equipment is in the at least one cell. In some embodiments of this aspect, the indication of the predicted movement path is configured to initiate a pre-allocation of resources for the at least one user equipment in a cell that is included in the predicted movement path. In some embodiments of this aspect, the pre-allocation of resources for the at least one user equipment is a pre-allocation of a contention-free preamble, the contention-free preamble being pre-configured and stored in a persistent memory at the at least one user equipment. In some embodiments of this aspect, collecting further includes collecting the path information and the corresponding time information from at least one of the at least one user equipment, a mobility management entity, and a base station. In some embodiments of this aspect, collecting further includes collecting historical path information from at least one of at least one initial attachment and at least one mobility procedure for the at least one user equipment, the historical path information including cell identifiers, time stamps, positioning coordinates and a user equipment identifier. In some embodiments of this aspect, collecting further includes receiving a tracking area update, TAU, message, the TAU message including a time stamp and positioning coordinates indicating a current location of the at least one user equipment.

In some embodiments of this aspect, collecting the location information further includes collecting the location information and corresponding time information, the collected location information and the corresponding time information associated with the movement of a plurality of user equipments within the network. In some embodiments of this aspect, predicting further includes predicting a network characteristic based at least in part on the collected location information and the time information. In some embodiments of this aspect, communicating the indication further includes communicating the indication of the predicted network characteristic. In some embodiments of this aspect, the predicting the network characteristic further includes predicting at least one of an amount of user equipments served by at least one cell and an amount of bearers for services in the at least one cell at a future time period based at least in part on the collected location information and the time information. In some embodiments of this aspect, the prediction is used for resource planning for the future time period in the at least one cell. In some embodiments of this aspect, the prediction is used for determining one of a time-division duplex, TDD, pattern and a frequency-division duplex, FDD, resource to use for the future time period in the at least one cell.

According to second aspect of the present disclosure, a core network node configured to facilitate communication of a user equipment in a communication system is provided. The core network node includes processing circuitry. The processing circuitry is configured to cause the core network node to collect location information, the collected location information associated with movement of at least one user equipment within a network. The processing circuitry is configured to cause the core network node to predict based at least part of the collected location information. The processing circuitry is configured to cause the core network node to communicate an indication of the prediction.

In some embodiments of this aspect, the processing circuitry is further configured to cause the core network node to predict by being configured to cause the core network node to predict according to a prediction algorithm, the prediction algorithm associating each of a plurality of different time windows with a different weight. In some embodiments of this aspect, the plurality of different time windows includes at least one a time of day, a day-of-the-week, a week-of-the-year, a month-of-the-year and a season, each time window associated with a different weight in the prediction algorithm. In some embodiments of this aspect, the processing circuitry is further configured to cause the core network node to predict according to the prediction algorithm by being configured to cause the core network node to determine at least one probability based at least in part on a weighted current prediction probability value and a weighted historical probability prediction value. In some embodiments of this aspect, an outcome of a preceding prediction determines a weight value applied to the current probability prediction value and a weight value applied to the historical prediction value.

In some embodiments of this aspect, the processing circuitry is further configured to cause the core network node to collect the location information by being configured to cause the core network node to collect path information and corresponding time information, the path information and the time information indicating the movement of the at least one user equipment between at least two radio network areas in the network. In some embodiments of this aspect, the processing circuitry is further configured to cause the core network node to predict by being configured to cause the core network node to predict a movement path of the at least one user equipment relative to the network, the predicting being based at least in part on the collected path information and the time information.

In some embodiments of this aspect, the processing circuitry is further configured to cause the core network node to communicate the indication by being configured to cause the core network node to communicate the indication of the predicted movement path of the at least one user equipment. In some embodiments of this aspect, the at least two radio network areas include at least two tracking areas and at least two cells. In some embodiments of this aspect, the indication of the predicted movement path includes at least one cell global identifier, CGI, the at least one CGI indicating at least one cell that the at least one user equipment is expected to move to according to the predicted movement path. In some embodiments of this aspect, the processing circuitry is further configured to cause the core network node to predict by being configured to cause the core network node to determine at least one probability of at least one movement path of the at least one user equipment, the at least one movement path including at least one of a cell and a neighboring cell of a base station. In some embodiments of this aspect, the indication of the predicted movement path is configured to be included in a paging request for the at least one user equipment, the paging request indicating, for at least one cell in the paging request, a probability prediction that the at least one user equipment is in the at least one cell. In some embodiments of this aspect, the indication of the predicted movement path is configured to initiate a pre-allocation of resources for the at least one user equipment in a cell that is included in the predicted movement path. In some embodiments of this aspect, the pre-allocation of resources for the at least one user equipment is a pre-allocation of a contention-free preamble, the contention-free preamble being pre-configured and stored in a persistent memory at the at least one user equipment.

In some embodiments of this aspect, the processing circuitry is further configured to cause the core network node to collect by being configured to cause the core network node to collect the path information and the corresponding time information from at least one of the at least one user equipment, a mobility management entity, and a base station. In some embodiments of this aspect, the processing circuitry is further configured to cause the core network node to collect by being configured to cause the core network node to collect historical path information from at least one of at least one initial attachment and at least one mobility procedure for the at least one user equipment, the historical path information including cell identifiers, time stamps, positioning coordinates and a user equipment identifier. In some embodiments of this aspect, the processing circuitry is further configured to cause the core network node to collect by being configured to cause the core network node to receive a tracking area update, TAU, message, the TAU message including a time stamp and positioning coordinates indicating a current location of the at least one user equipment.

In some embodiments of this aspect, the processing circuitry is further configured to cause the core network node to collect the location information by being configured to cause the core network node to collect the location information and corresponding time information, the collected location information and the corresponding time information associated with the movement of a plurality of user equipments within the network. In some embodiments of this aspect, the processing circuitry is further configured to cause the core network node to predict by being configured to cause the core network node to predict a network characteristic based at least in part on the collected location information and the time information. In some embodiments of this aspect, the processing circuitry is further configured to cause the core network node to communicate the indication by being configured to cause the core network node to communicate the indication of the predicted network characteristic. In some embodiments of this aspect, the processing circuitry is further configured to cause the core network node to predict the network characteristic by being configured to cause the core network node to predict at least one of an amount of user equipments served by at least one cell and an amount of bearers for services in the at least one cell at a future time period based at least in part on the collected location information and the time information. In some embodiments of this aspect, the prediction is used for resource planning for the future time period in the at least one cell. In some embodiments of this aspect, the prediction is used for determining one of a time-division duplex, TDD, pattern and a frequency-division duplex, FDD, resource to use for the future time period in the at least one cell.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
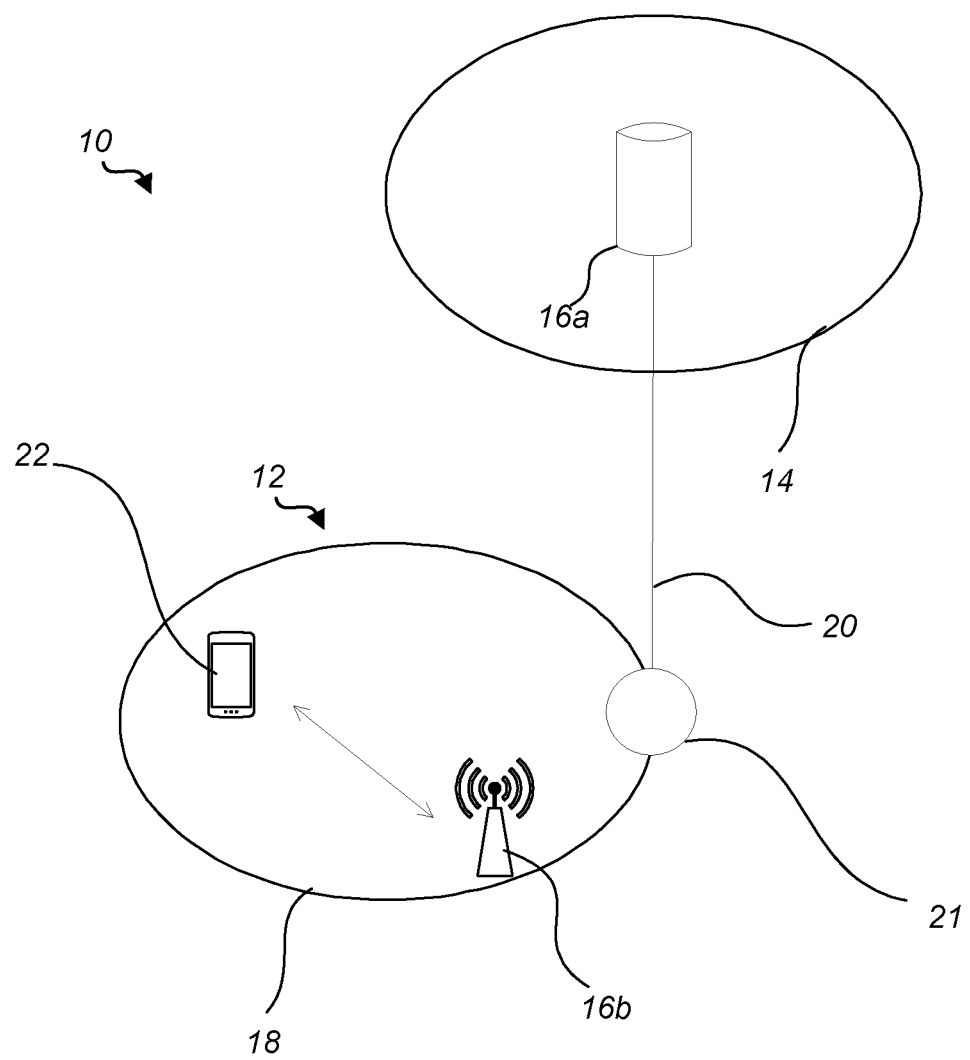
FIG. 1 is a schematic diagram of an example communication system including a radio access network (RAN) including a network node and a user equipment (UE) and a gateway connected to a core network including a network node operating as data collection node according to one embodiment of the present disclosure.

Wireless communication networks are not currently using AI to predict behavior to optimize resource allocation. Wireless communication networks are also not currently using AI to predict user equipment (UE) routes to optimize mobility or predict where the UE is most likely to be when paging the UE. Some embodiments of the present disclosure propose techniques to utilize AI in order to predict behavior to optimize resource allocation and/or to optimize UE paging.

Some embodiments of the present disclosure provide arrangements for radio access network nodes (and/or related nodes) to collect data from different UEs and scenarios during different times of the day, different days of the year, different months, different seasons, etc. to predict future behavior in one or more of the following areas:

Predict load at different times for a load-based time division-duplex (TTD) pattern selection. In some embodiments, load predictions may result in a change or selection of TDD patterns for different days and times based on learned loads and types of resources to be used for different days and times. For example, some cells can be assigned a higher ratio of downlink slots if the traffic expected is mostly downlink. Fifth Generation (5G, also called New Radio (NR)) Third Generation Partnership Project (3GPP) standards may allow flexible combinations of downlink and uplink slots to form TDD patterns.

Predict aggregated resources and services that may be used based on learned behavior (e.g., machine learned behavior and/or prediction algorithms) for specific days and/or times. For example, predict the expected resources for control channels versus data channels.

Predict services and resources to be used for specific UEs (e.g., gold users) based on learned behavior (e.g., machine learned behavior and/or prediction algorithms) relative to specific days and/or times.

Predict routes for specific UEs (e.g., gold users) based on learned behavior (e.g., machine learned behavior and/or prediction algorithms) relative to different days and times. For example, the next nodes in a predicted UE-path can be prepared ahead of time for the UE based on the expected path and the expected services and/or resources.

Predict the tracking area and possibly the MME and the base station (e.g., gNB) that the UE is most likely to be located at when paging the UE, based on learned behavior.

The data to collect for different days and times that may assist the AI algorithm to predict future UE and/or network behavior may include one or more of:

Number of UEs connecting to the access network (e.g., radio access network) at specific days and/or times.

Average number of new attachments per cell and per network node.

Average number of UEs moving from a non-neighboring cell and a non-neighboring node.

Routes followed by all UE(s) at specific days and times on average for all UEs in the network.

Routes followed at specific days and times for specific UE(s).

Improvement of mobility procedures for UEs with predicted paths.

Type of services activated for a cell and for a network node.

Aggregated uplink (UL) and downlink (DL) bit rates used for a cell and a network node.

Average speeds of UE paths.

Signal quality on different routes for different days and/or times.

Position coordinates of the UE from Tracking Area Updates (TAUs) and from paths recorded. The expected/predicted position/location of the UE may be used for more accurate paging procedures.

The output and/or resulting decisions for one or more of the techniques disclosed herein may include one or more of the following:

Improved allocation of resources to match expected demand at different days and/or times.

Predicting routes for specific users at specific times and/or days of the week to optimize resources and to optimize mobility procedures. For example, a gold user can subscribe to services that optimize mobility of routes by permitting the network to learn the path(s) of the route(s) that the UE takes and/or to have the network nodes (e.g., gNBs) prepare ahead of time for the expected service type on the expected days and times.

TDD patterns may be selected and/or used by a network node (e.g., gNB) based on the expected load levels for different resource types and based on uplink versus downlink resource use predictions.

Network slices may be assigned resources based on the expected/predicted load.

Pre-allocated resources may be used for expected services. For example, transport bearers can be pre-allocated between a network node (e.g., gNB) and a gateway based on expected services.

The service types that are most likely expected may be calculated for a set of network nodes (e.g., gNBs) for different times of the day and/or for different days.

Optimized paging procedures by allowing the AI algorithms predict the location of a UE at any given time.

It should be understood that although the disclosure may discuss optimizing for different times and/or days, the optimization may be for any defined time period.

Some embodiments of the present disclosure may provide one or more of the following advantages:

Optimizing the resource allocation per network node (e.g., gNB), per cell, and/or per network slice based on learning algorithms applied to continuously collected data from different scenarios.

Optimizing UE mobility by predicting the UE path and preparing the network nodes (e.g., gNB) in the predicted UE path ahead of time considering one or more of:
day and/or time;
special events in the area where the UE is located;
Bandwidth/throughput requirements expected at different points in the path;
radio frequency (RF) signal strength for the expected/predicted path;
network influence on a preferred path for the UE when, for example, a path is available that is better (e.g., in terms of signal strength, bandwidth/throughput, etc.) than the one that the UE attempts to take.

Optimizing UE paging procedures, including selecting the beam to use (beam forming case), by tracking the UE locations not only during idle mode but also when the UE is connected to the network and following a path.

Optimizing selection of the TDD pattern for different days, times, and when there are special events in the area by predicting the load on cells for the two different directions from data collected in the past.

Before describing in detail exemplary embodiments, it is noted that the embodiments reside primarily in combinations of apparatus components and processing steps related to artificial intelligence (AI) for communication networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a wireless device (WD) or a radio network node. In some embodiment, the network node comprises a mobile management entity (MME), an access and mobility management function (AMF), a self-organizing network (SON) node, a coordinating node, a positioning node, an MDT node, etc.

In some embodiments, the network node may be a "core network node" such as, for example, a database collecting and/or predicting according to the techniques disclosed herein.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity WD, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

As used herein, the term "collected" is used in a broad sense and may include receiving and storing the received data.

As used herein, the term "pre-configured" may refer to information being available without specific configuration from a network or network node, e.g. stored in memory, for example independent of being configured. Configured or configurable may be considered to pertain to the corresponding information being set/configured, e.g. by the network or a network node.

Any two or more embodiments described in this disclosure may be combined in any way with each other.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a WD, in particular control and/or user or payload data, and/or via or on which a WD transmits and/or may transmit data to the node; a serving cell may be a cell for or on which the WD is configured and/or to which it is synchronized and/or has performed an access procedure, e.g., a random access procedure, and/or in relation to which it is in a RRC_connected or RRC_idle state, e.g., in case the node and/or WD and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., an MTC cell and/or a conventional cell.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement, configures a WD 22, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a physical uplink shared channel (PUSCH), a physical uplink control channel (PUCCH), a physical downlink control channel (PDCCH) and a physical uplink shared channel (PUSCH).

Note that although terminology from one particular wireless system, such as, for example, Third Generation Partnership Project (3GPP) Long Term Evolution (LTE) and/or New Radio (NR, also called Fifth Generation or 5G), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network (RAN), and a core network 14. The core network 14 includes a core network node 16a, which may implement one or more of the data collection and/or prediction techniques disclosed herein.

The access network 12 comprises a network node 16b (e.g., NB, eNB, gNB or other types of wireless access point), the network node 16b defining a corresponding coverage area 18 (such as a cell). The access network node 16b is connectable to the core network 14 over a wired or wireless connection 20 via e.g., a gateway 21 (e.g., user plane function (UPF)). A user equipment (UE) 22a located in coverage area 18 is configured to wirelessly connect to, or be paged by, the corresponding network node 16b. While a single UE is illustrated in this example, the disclosed embodiments are also applicable to a situation where a plurality of UEs 22 are in the coverage area 18 or where a plurality of UEs 22 are connecting to the corresponding network node 16b. Note that although a single access network node 16b and a single core network node 16a are shown for convenience, the communication system 10 may include many more access network nodes 16b and many more core network nodes 16a.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

A network node 16 is configured to include a collection unit 32 which is configured to collect location information, the collected location information associated with movement of at least one user equipment within a network. A network node 16 may also be configured to include a prediction unit 34 which is configured to predict based at least part of the collected location information and/or communicate an indication of the prediction.

Example implementations, in accordance with an embodiment, of the UE 22 and the network node 16 (e.g., network node 16a) discussed in the preceding paragraphs will now be described with reference to FIG. 2.

Figure 2:
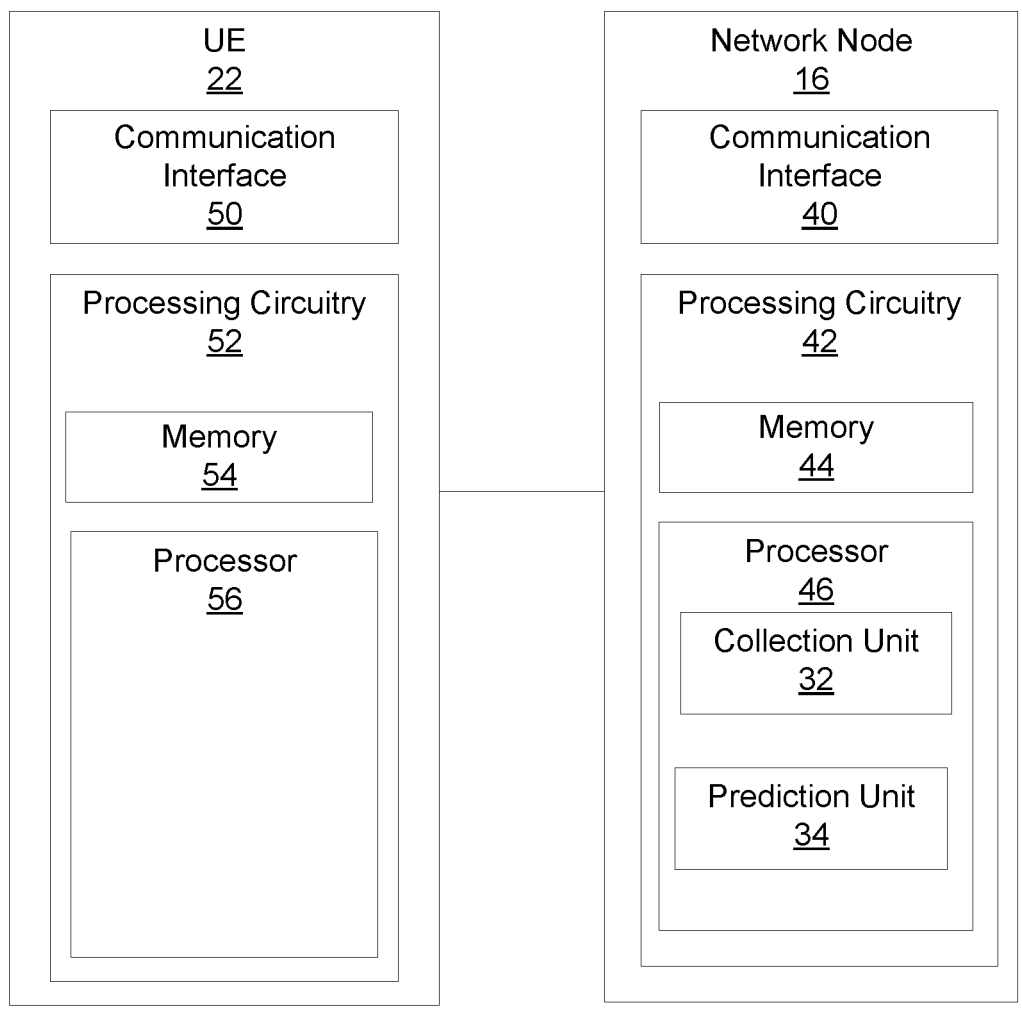
FIG. 2 is a block diagram of another example communication system including a UE and a network node according to one embodiment of the present disclosure.

Referring to FIG. 2, in a communication system 10, a network node 16 (e.g., network node 16a or 16b) provided in a communication system 10 and including hardware enabling it to communicate with the UE 22 and other devices in the communication system 10. The hardware may include a communication interface 40 for setting up and maintaining a wired and/or wireless connection with an interface of a different communication device of the communication system 10, such as for example an access network node 16b, a gateway 21, a core network node 16 and/or other devices of the communication system 10 (e.g., AMF/MME). In some embodiments, the communication interface 40 may include a radio interface for setting up and maintaining at least a wireless connection with a UE 22. The radio interface may be formed as or may include, for example, one or more RF transmitters, one or more RF receivers, and/or one or more RF transceivers.

In the embodiment shown, the hardware of the network node 16 further includes processing circuitry 42. The processing circuitry 42 may include a memory 44 and a processor 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software stored internally in, for example, memory 44, or stored in external memory (e.g., database, storage array, network storage device, etc.) accessible by the network node 16 via an external connection. The software may be executable by the processing circuitry 42. The processing circuitry 42 may be configured to control any of the methods and/or processes described herein and/or to cause such methods, and/or processes to be performed, e.g., by network node 16. Processor 46 corresponds to one or more processors 46 for performing network node 16 functions described herein. The memory 44 is configured to store data, programmatic software code and/or other information described herein. In some embodiments, the software may include instructions that, when executed by the processor 46 and/or processing circuitry 42, causes the processor 46 and/or processing circuitry 42 to perform the processes described herein with respect to network node 16. For example, processing circuitry 42 of the network node 16 may include collection unit 32 and/or prediction unit 34 configured to perform the network node processes discussed herein, such as for example as discussed with reference to the flowchart in FIG. 3 and the other figures.

The communication system 10 further includes the UE 22 already referred to. The UE 22 may have hardware that may include a communication interface 50 configured to set up and maintain a wireless connection with a network node 16 serving a coverage area 18 in which the UE 22 is currently located. The communication interface 50 may be formed as or may include, for example, one or more RF transmitters, one or more RF receivers, and/or one or more RF transceivers. The communication interface 50 may include an interface for setting up and maintaining a wired and/or wireless connection with an interface of a different communication device of the communication system 10, such as for example, a mobility management node (e.g., AMF/MME).

The hardware of the UE 22 further includes processing circuitry 52. The processing circuitry 52 may include a memory 54 and a processor 56. In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software, which is stored in, for example, memory 54 at the UE 22, or stored in external memory (e.g., database, storage array, network storage device, etc.) accessible by the UE 22. The software may be executable by the processing circuitry 52. The software may include a client application. The client application may be operable to provide a service to a human or non-human user via the UE 22. In providing the service to the user, the client application may receive request data and provide user data in response to the request data. The client application may interact with the user to generate the user data that it provides.

The processing circuitry 52 may be configured to control any of the methods and/or processes described herein and/or to cause such methods, and/or processes to be performed, e.g., by UE 22. The processor 56 corresponds to one or more processors 56 for performing UE 22 functions described herein. The UE 22 includes memory 54 that is configured to store data, programmatic software code and/or other information described herein. In some embodiments, the software and/or the client application may include instructions that, when executed by the processor 56 and/or processing circuitry 52, causes the processor 56 and/or processing circuitry 52 to perform the processes described herein with respect to UE 22.

In some embodiments, the inner workings of the network node 16 and UE 22 may be as shown in FIG. 2 and independently, the surrounding network topology may be that of FIG. 1.

In FIG. 2, the connection between the user equipment 22 and the network node 16 is shown without explicit reference to any intermediary devices and the precise routing of messages via these devices. Network infrastructure may determine the routing, which it may be configured to hide from the UE 22 or from a service provider, or both. The network infrastructure may further take decisions by which it dynamically changes the routing (e.g., on the basis of load balancing consideration or reconfiguration of the network).

Although FIGS. 1 and 2 show various "units" such as collection unit 32, and prediction unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
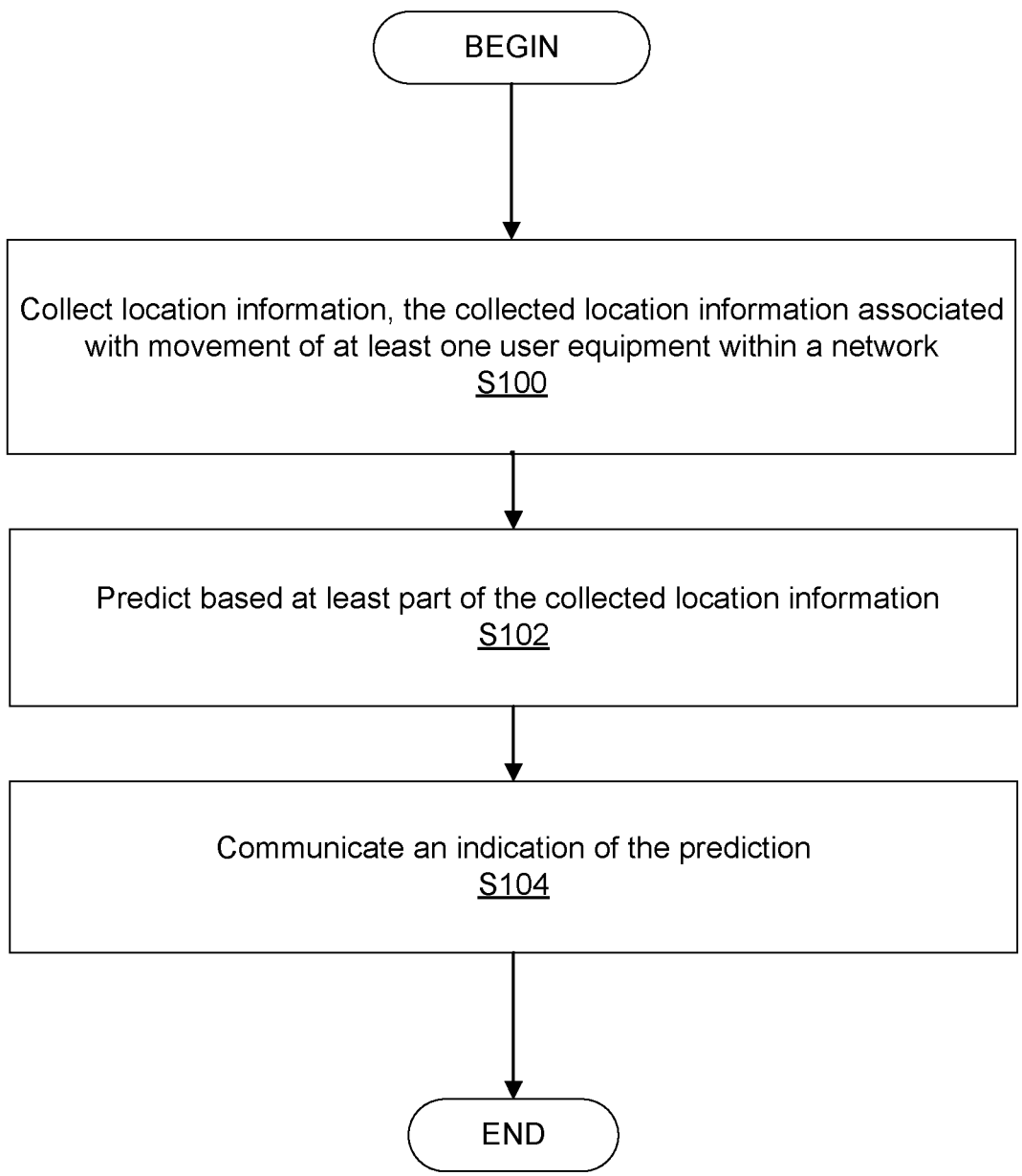
FIG. 3 is a flowchart of an example method for a network node according to one embodiment of the present disclosure.

FIG. 3 is a flowchart of an exemplary process in a network node 16 (e.g., network node 16a) for AI optimization techniques according to some embodiments of the present disclosure. One or more Blocks and/or functions and/or methods performed by the network node 16 may be performed by one or more elements of network node 16 such as by collection unit 32 and/or prediction unit 34 in processing circuitry 42, processor 46, communication interface 40, etc. according to the example method. The example method includes collecting (Block S100), such as via collection unit 32, prediction unit 34, processing circuitry 42, processor 46 and/or communication interface 40, location information, the collected location information associated with movement of at least one user equipment 22 within a network. The method includes predicting (Block S102), such as via collection unit 32, prediction unit 34, processing circuitry 42, processor 46 and/or communication interface 40, location information, based at least part of the collected location information. The method includes communicating (Block S104), such as via collection unit 32, prediction unit 34, processing circuitry 42, processor 46 and/or communication interface 40, location information, an indication of the prediction.

In some embodiments, predicting further includes predicting, such as via collection unit 32, prediction unit 34, processing circuitry 42, processor 46 and/or communication interface 40, according to a prediction algorithm, the prediction algorithm associating each of a plurality of different time windows with a different weight. In some embodiments, the plurality of different time windows includes at least one a time of day, a day-of-the-week, a week-of-the-year, a month-of-the-year and a season, each time window associated with a different weight in the prediction algorithm. In some embodiments, predicting according to the prediction algorithm further includes determining, such as via collection unit 32, prediction unit 34, processing circuitry 42, processor 46 and/or communication interface 40, at least one probability based at least in part on a weighted current prediction probability value and a weighted historical probability prediction value. In some embodiments, an outcome of a preceding prediction determines a weight value applied to the current probability prediction value and a weight value applied to the historical prediction value.

In some embodiments, collecting the location information further includes collecting, such as via collection unit 32, prediction unit 34, processing circuitry 42, processor 46 and/or communication interface 40, path information and corresponding time information, the path information and the time information indicating the movement of the at least one user equipment between at least two radio network areas in the network. In some embodiments, predicting further includes predicting, such as via collection unit 32, prediction unit 34, processing circuitry 42, processor 46 and/or communication interface 40, a movement path of the at least one user equipment relative to the network, the predicting being based at least in part on the collected path information and the time information. In some embodiments, communicating the indication further includes communicating, such as via collection unit 32, prediction unit 34, processing circuitry 42, processor 46 and/or communication interface 40, the indication of the predicted movement path of the at least one user equipment 22. In some embodiments, the at least two radio network areas include at least two tracking areas and at least two cells.

In some embodiments, the indication of the predicted movement path includes at least one cell global identifier, CGI, the at least one CGI indicating at least one cell that the at least one user equipment is expected to move to according to the predicted movement path. In some embodiments, the predicting further includes determining, such as via collection unit 32, prediction unit 34, processing circuitry 42, processor 46 and/or communication interface 40, at least one probability of at least one movement path of the at least one user equipment 22, the at least one movement path including at least one of a cell and a neighboring cell of a base station. In some embodiments, the indication of the predicted movement path is configured to be included in a paging request for the at least one user equipment, the paging request indicating, for at least one cell in the paging request, a probability prediction that the at least one user equipment 22 is in the at least one cell. In some embodiments, the indication of the predicted movement path is configured to initiate a pre-allocation of resources for the at least one user equipment 22 in a cell that is included in the predicted movement path.

In some embodiments, the pre-allocation of resources for the at least one user equipment 22 is a pre-allocation of a contention-free preamble, the contention-free preamble being pre-configured and stored in a persistent memory at the at least one user equipment 22. In some embodiments, collecting further includes collecting, such as via collection unit 32, prediction unit 34, processing circuitry 42, processor 46 and/or communication interface 40, the path information and the corresponding time information from at least one of the at least one user equipment, a mobility management entity, and a base station. In some embodiments, collecting further includes collecting, such as via collection unit 32, prediction unit 34, processing circuitry 42, processor 46 and/or communication interface 40, historical path information from at least one of at least one initial attachment and at least one mobility procedure for the at least one user equipment 22, the historical path information including cell identifiers, time stamps, positioning coordinates and a user equipment identifier.

In some embodiments, collecting further includes receiving, such as via collection unit 32, prediction unit 34, processing circuitry 42, processor 46 and/or communication interface 40, a tracking area update, TAU, message, the TAU message including a time stamp and positioning coordinates indicating a current location of the at least one user equipment 22. In some embodiments, collecting the location information further includes collecting, such as via collection unit 32, prediction unit 34, processing circuitry 42, processor 46 and/or communication interface 40, the location information and corresponding time information, the collected location information and the corresponding time information associated with the movement of a plurality of user equipments 22 within the network. In some embodiments, predicting further includes predicting, such as via collection unit 32, prediction unit 34, processing circuitry 42, processor 46 and/or communication interface 40, a network characteristic based at least in part on the collected location information and the time information. In some embodiments, communicating the indication further includes communicating, such as via collection unit 32, prediction unit 34, processing circuitry 42, processor 46 and/or communication interface 40, the indication of the predicted network characteristic.

In some embodiments, the predicting the network characteristic further includes predicting, such as via collection unit 32, prediction unit 34, processing circuitry 42, processor 46 and/or communication interface 40, at least one of an amount of user equipments 22 served by at least one cell and an amount of bearers for services in the at least one cell at a future time period based at least in part on the collected location information and the time information. In some embodiments, the prediction is used for resource planning for the future time period in the at least one cell. In some embodiments, the prediction is used for determining one of a time-division duplex, TDD, pattern and a frequency-division duplex, FDD, resource to use for the future time period in the at least one cell.

Having generally described arrangements for optimization and/or artificial intelligence (AI) for communication networks, functions and processes are provided as follows, and which may be implemented by one or more network nodes 16 and/or a user equipment 22.

TTD Pattern Activation/Deactivation

In some embodiments, the AI algorithm, such as for example via a network node 16a, uses the collected information to estimate loads for uplink and downlink directions for different days and/or different time periods and/or based on different service types (e.g., short message service, voice, streaming, etc.). Different services may require difference mixtures of uplink/downlink resources. For example, video centric applications such as YouTube, Netflix, and broadcast/multicast video services require much higher downlink throughputs than uplink. On the other hand, services such as voice-over Internet Protocol (VoIP) tend to be generally symmetric with respect to uplink and downlink throughputs. Thus, in some embodiments, an optimal TDD pattern may be selected, such as for example via a network node 16b (e.g., base station), according to expected, estimated and/or predicted UL-DL resources to be used by e.g., a cell during a certain period of time/day. For example, for time periods in which the network node 16 expects or predicts a large amount of DL resources (e.g., high streaming traffic time periods), a TDD pattern with more DL resources than UL resources may be selected. For time periods in which the network node 16 expects or predicts symmetric UL and DL throughputs, a TDD pattern with an equal or close to equal amount of UL and DL resources may be selected.

In some embodiments, the predicted/expected UL-DL resource usage may be sent to the network node 16b (e.g., base station) of the cell (e.g., by the core network node 16a that may collect data and calculate predictions) and the network node 16b may determine the TDD pattern based at least in part on such predictions. In other embodiments, the core network node 16a may suggest TDD patterns based on its own predictions and send such information to an access network node 16b (e.g., base station).

Collecting Data for UE Path

Figure 4:
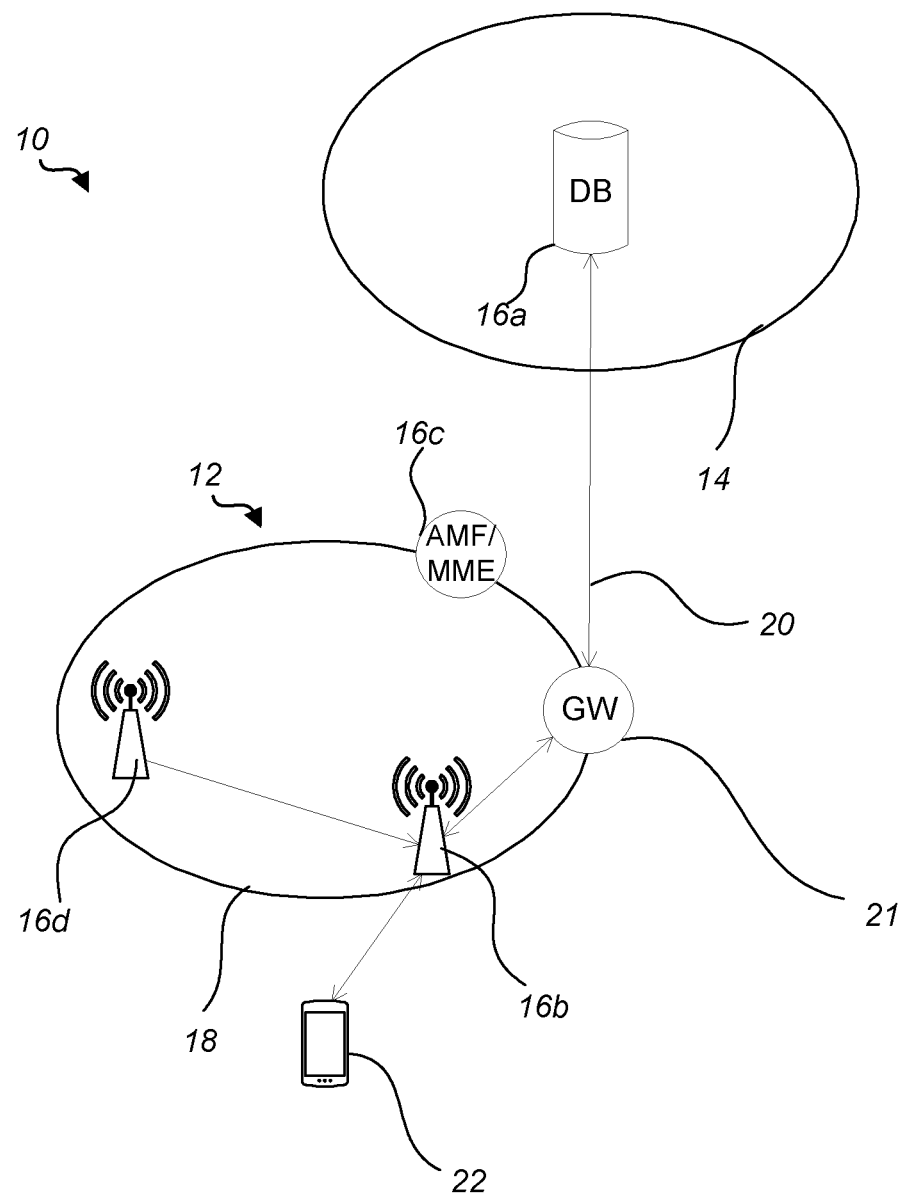
FIG. 4 is a schematic diagram illustrating an example of UE path recording between network nodes according to one embodiment of the present disclosure.
Figure 5:
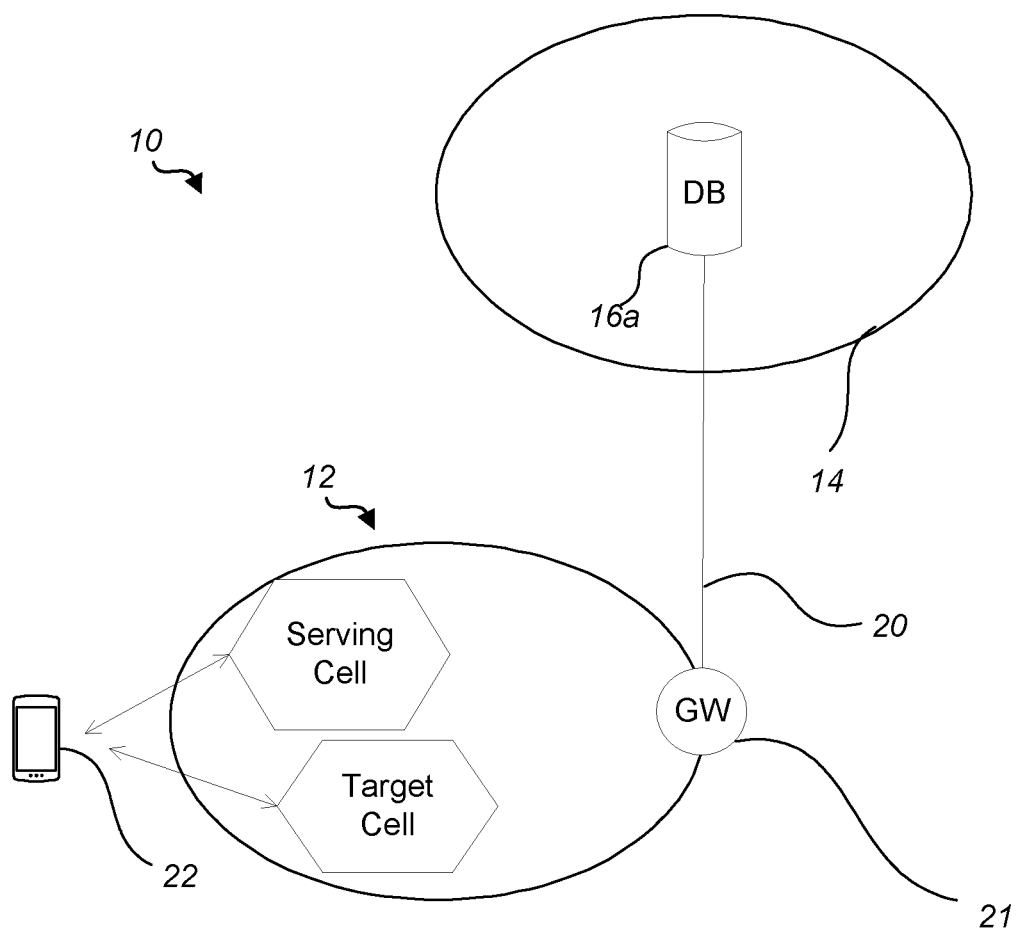
FIG. 5 is a schematic diagram illustrating an example of UE path recording between cells according to one embodiment of the present disclosure.
Figure 6:
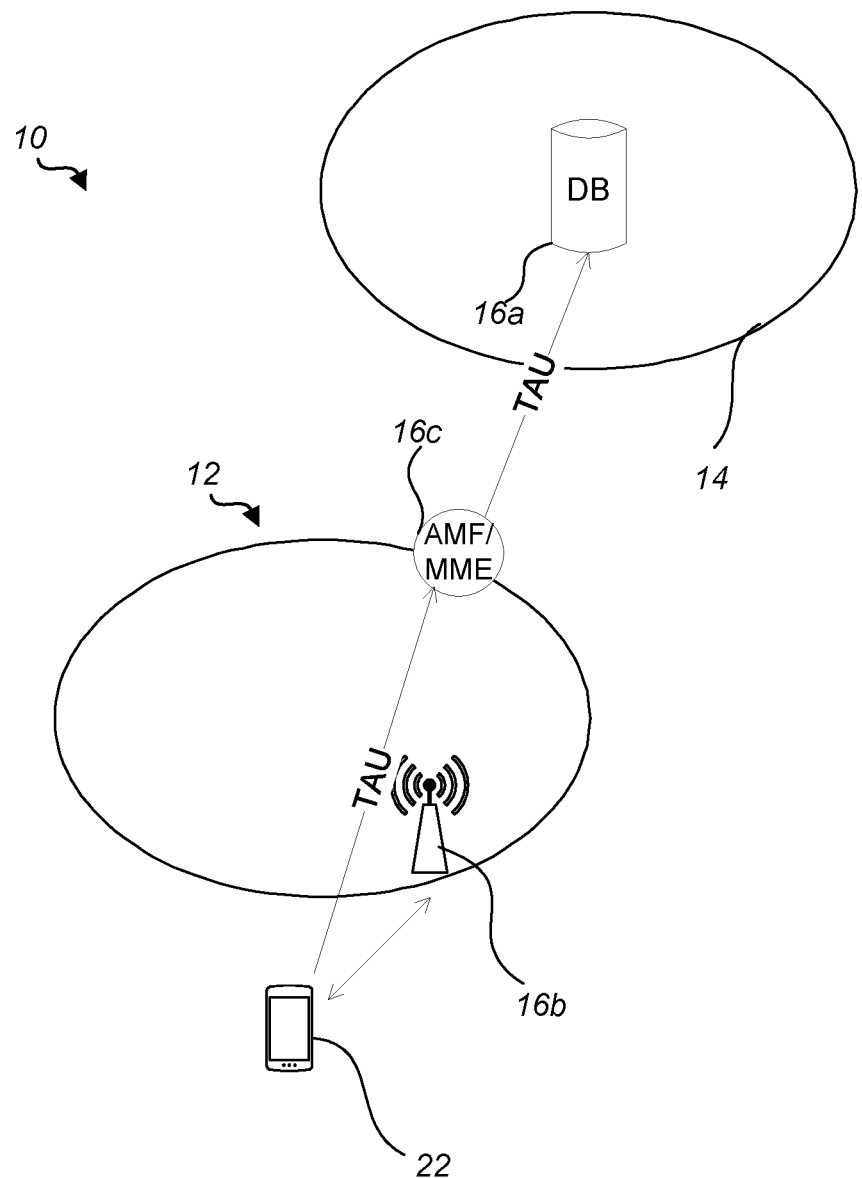
FIG. 6 is a schematic diagram illustrating an example of UE path recording for an Idle UE according to one embodiment of the present disclosure.

In some embodiments, predictions may be made on the most likely path a UE 22 may take on a specific day (e.g., day of the week) and/or time period (e.g., morning commute time, afternoon, evening commute time, evening hours, sleeping hours, etc.). These predications may be calculated by the AI algorithms at the network node 16 (e.g., core network node 16a) and may be based on UE-specific data collected in the past (e.g., historical UE 22 data for a particular UE 22). The granularity of the UE 22 path prediction can be, for example, at the base station (e.g., eNB/gNb) level, at the cell level, etc. In some embodiments, more accurate UE 22 path predictions may be determined if UE 22 positioning coordinates are used when recording/collecting (e.g., storing at a database corresponding to the core network node 16a) data daily for UEs 22. In some embodiments, the data collecting/recording procedures may be performed according to one or more of the following:

1. Initial attachment: As depicted in FIG. 4, when a UE 22 attaches to the network, e.g., network node 16d (e.g., serving eNB/gNB) of the initial attachment, the cell used and/or the UE 22 positioning coordinates are collected and stored/recorded for the UE 22 (e.g., by network node 16d) and reported to a centralized database, such as the core network node 16a. Included in the data collected and recorded may be, for example, one or more of the services the UE 22 is using, the RF signal related data, time stamp(s), positioning (e.g., global positioning coordinates), etc. at the initial attachment, as well as, a UE identifier associated to the collected data. Such information may be collected and recorded as the UE 22 switches from one cell to the next cell within a network node 16 (e.g., base station), as well as, across multiple network nodes 16 (e.g., from serving network node 16d to target network node 16b as illustrated in FIG. 4). The network nodes 16 (e.g., base stations) may report such collected and recorded information to the centralized database (e.g., core network node 16a) so that e.g., the data can be learned from and/or UE 22 path predictions can be made therefrom by e.g., the AI algorithm. In some embodiments, the speed of the UE 22 path may also be collected, recorded and updated, as well as, the time spent in the serving cell and serving node(s) and the services that are provided to the UE 22.
2. Mobility at the cell level: As depicted in FIG. 5, when the UE 22 moves from one serving cell to a target cell during mobility procedures, identifiers for the target cell and corresponding network node 16 (e.g., target gNB) may be recorded for the UE 22 and reported to the centralized database, such as the core network node 16a. Included in the data collected and recorded may be one or more of the services the UE 22 is using, the RF signal related data, timestamp(s), etc. during the mobility procedures, as well as, a UE identifier associated to the collected data. Also, positioning data can be recorded and reported to the database if available. The speed of the UE 22 path during mobility, the time spent in the serving cell and connected to the serving network node 16, the services provided to the UE 22, etc. may also be reported to the core network node 16a.
3. Mobility at the beam level: When using beam forming, the chosen beams, the configuration of the beam (e.g., the direction of the beam, transmission power, RF strength, etc.) and the UE's 22 positioning coordinates if available may be collected and recorded for the UE 22 by the serving network nodes 16 (e.g., base stations) and reported to the core network node 16a.
4. Carrier aggregation: If the UE 22 is using carrier aggregation and/or dual connectivity, the data collected and recorded for the UE 22 may include the number of carriers, the main and secondary cells for the carrier aggregation, the LTE cells and the 5G/NR cells used by the UE 22, etc.
5. Positioning coordinates: Positioning coordinates for the UE 22, if available, may be collected and recorded for the UE 22 by network nodes 16 and reported to the core network node 16a. To be able to record UE 22 coordinates the UE 22 may have location features such as a Global Positioning System (GPS), or 3GPP RAN UE positioning information (e.g., cell ID, enhanced cell ID, observed time difference of arrival (OTDOA), etc.).
6. Path recording for IDLE UE: FIG. 6 illustrates one example for path recording for an IDLE UE 22. Some embodiments may include combining, e.g., by core network node 16a, tracking area updates (TAUs) with learned UE 22 paths to refine predictions on where the UE 22 can be found at different days and/or different time periods. The tracking area updates (TAUs) may be enhanced with timestamps and position coordinates, which may be transmitted by the UE 22 to the core network node 16a via a mobility network node 16c, such as an access and mobility management function (AMF) and/or a mobility management entity (MME). Some embodiments of the present disclosure may include adding a plurality of new interfaces to a centralized database (e.g., core network node 16a) to be able to collect and record the collected data from multiple network nodes 16 (e.g., base station nodes, mobility management nodes, gateway notes, network function nodes, etc.) and/or to provide the data in a form that is usable for AI algorithms (e.g., featurization) and/or to obtain expected values/predictions calculated by the AI algorithms. In some embodiments, the data is collected, and predictions made at one network node 16. In some embodiments, the data is initially collected at one or more network nodes 16 and then sent to one or more other network nodes 16 at which the predictions are made.

Figure 8:
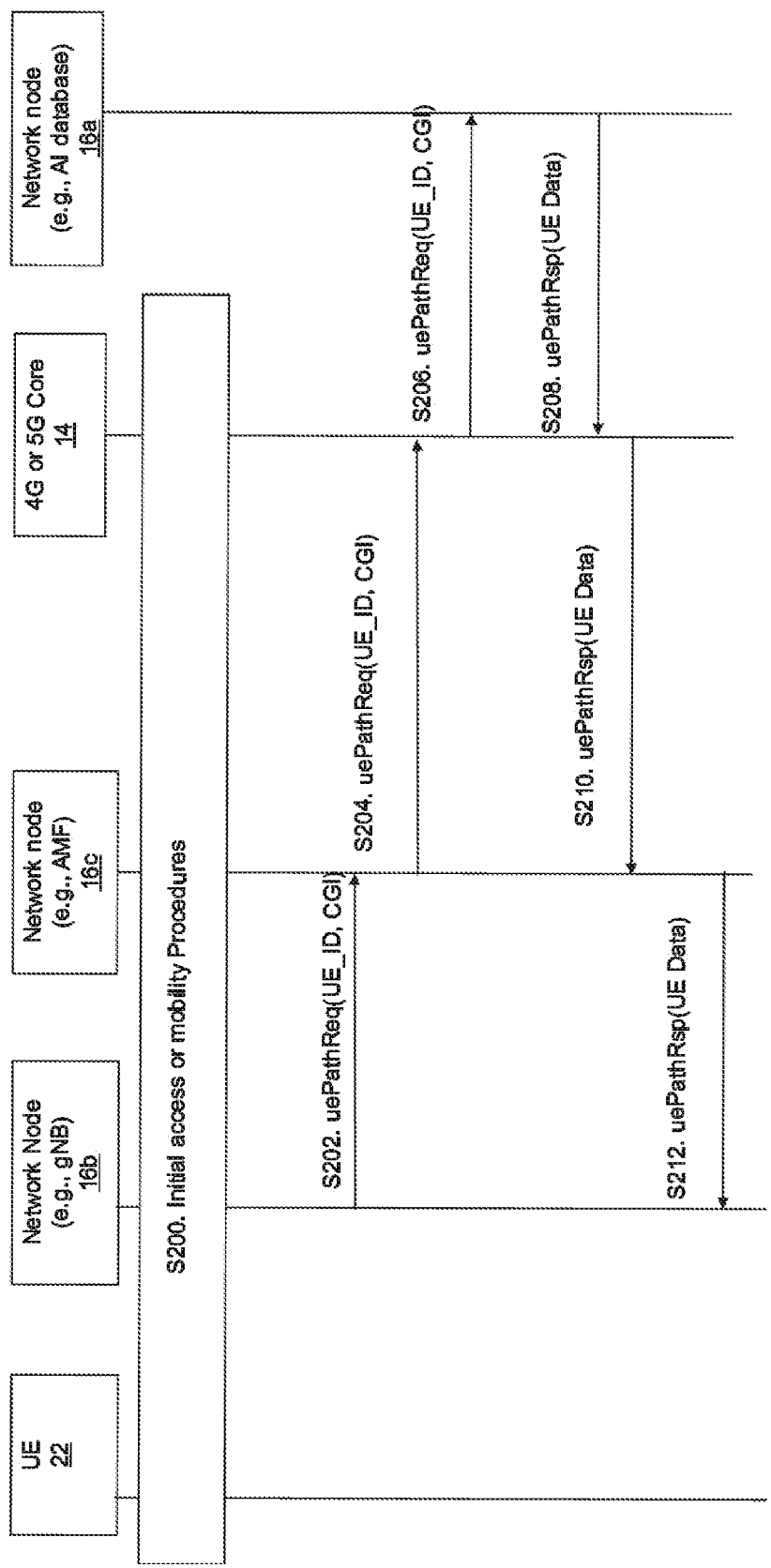
FIG. 8 is flow diagram illustrating an example of UE path retrieval initiated by a serving cell according to one embodiment of the present disclosure.

FIG. 8 shows an example process of UE 22 path retrieval that is initiated by a serving cell according to one embodiment of the present disclosure. In Block S200, the UE 22 may perform initial access or mobility procedures. In Block S202, the serving network node 16b (e.g., gNB) may send a request message to the mobility network node 16c (e.g., MME, AMF, etc.) request the UE 22 path. In some embodiments, the request may include a UE 22 identifier identifying the particular UE 22 whose path is being requested. The request may also include a cell global identifier (CGI) or other identifier of the serving network node 16b. In Block S204, the mobility network node 16c (e.g., MME, AMF, etc.) sends the request to the core 14. In Block S206, the request is sent to the core network node 16a. The core network node 16a may predict the UE 22 path and send the prediction back towards the initiating serving network node 16a, in steps S208-S212. The core network node 16a may predict the UE 22 path based on the historical location and time information collected for the UE 22, as well as, the current time and location for the UE 22 (e.g., based on the CGI and the time the request was sent).

Data Collection Used to Predict Future Behavior a. UE Route Prediction

In some embodiments, UE 22 mobility procedures can be optimized when the network nodes 16 have collected enough information to predict (e.g., using machine learning algorithms, etc.) the most likely route that a particular UE 22 will follow. For example, the neighboring cell or cells most likely to be the next serving cell for the UE 22 can be prepared ahead the time for the UE 22 to move to. For a neighboring cell co-located with the serving cell, the network node 16 can setup the resources for the UE 22 as soon as the UE 22 attaches to the serving cell/network node 16. For a neighboring cell located in a different network node 16 (e.g., gNodeB) from that of the serving cell, the serving network node 16 (e.g., gNodeB) may send a resource allocation request to the potential target network node 16 (e.g., gNodeB) via e.g., a base station-to-base station interface, such as, Xn/X2 interface. Preparation of resources in a potential target cell and/or the request allocation request to the potential target cell may be sent (ahead of time) as a result of the prediction, rather than as a result of the typical mobility procedures.

Figure 9:
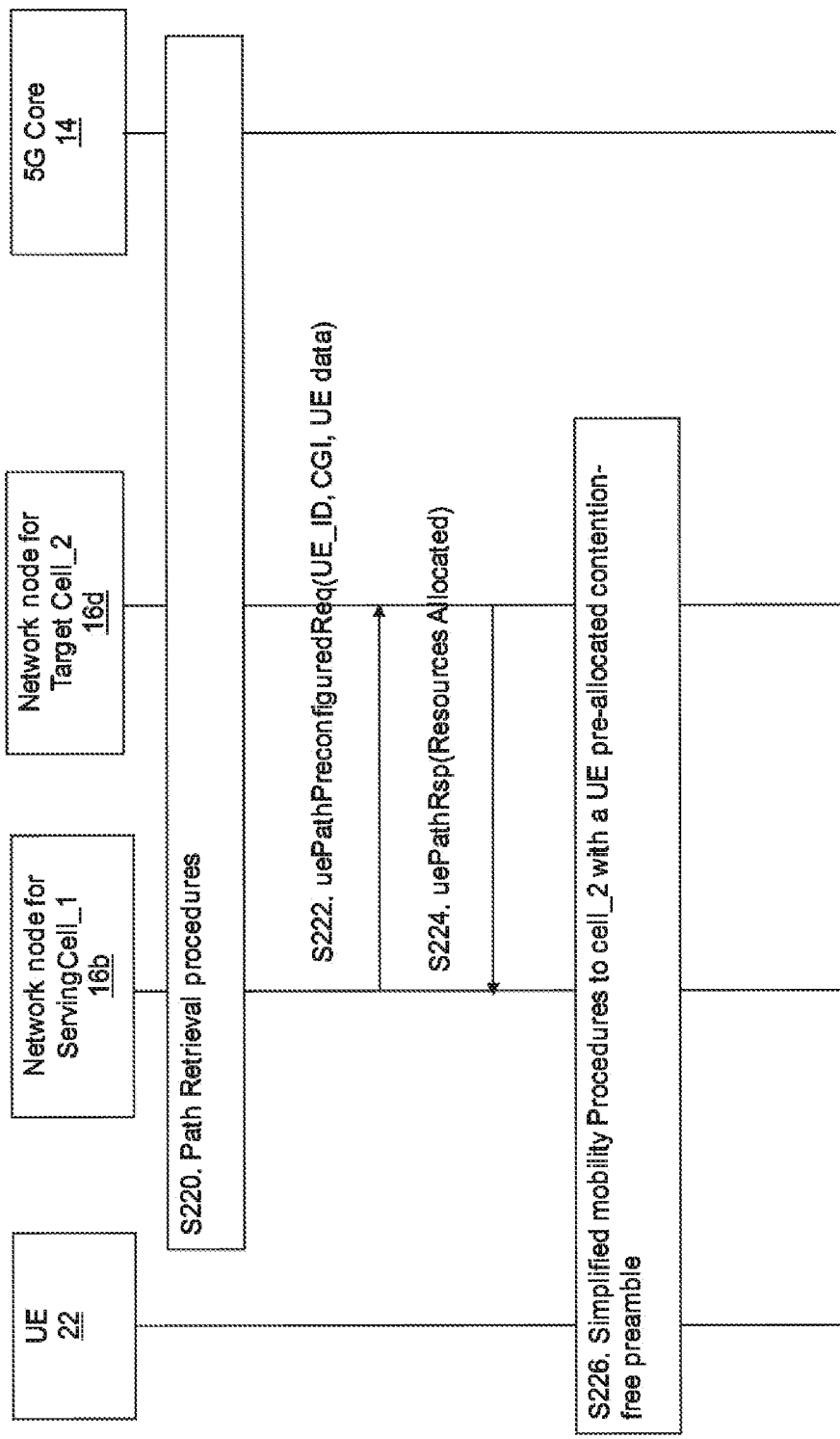
FIG. 9 is a flow diagram illustrating an example of UE path resource pre-allocation according to one embodiment of the present disclosure.

FIG. 9 illustrates an example process for UE 22 path resource pre-allocation for optimized mobility procedures according to one embodiment of the present disclosure (serving cell initiated). In Block S220, the network node 16*b* for serving cell 1 may request the predicted UE 22 path (see e.g., FIG. 8 for an example of UE 22 path retrieval). In Block S222, based on the predicted path, the network node 16*b* for serving cell 1 may send a request to the network node 16*b* for a target cell 2, which may be in the predicted UE 22 path. The request to the target cell may include a request to pre-allocate resources to the UE 22 using pre-configured resources. The pre-configured resources may include a pre-allocated contention-free preamble. As shown in Block S222 in FIG. 9, the request to the target cell may include an identifier of the UE 22, the CGI of the serving network node 16*b* and UE 22 data required to set-up the pre-allocated resources. In Block S224, the network node 16*d* for the target cell 2 may send a response to the serving network node 16*b*. The response may indicate the pre-allocated resources. In Block S226, the UE 22 may perform mobility procedures to switch to the target cell 2 using the pre-allocated resources e.g., pre-allocated contention-free preamble (which may be stored in persistent memory at the UE 22).

Figure 10:
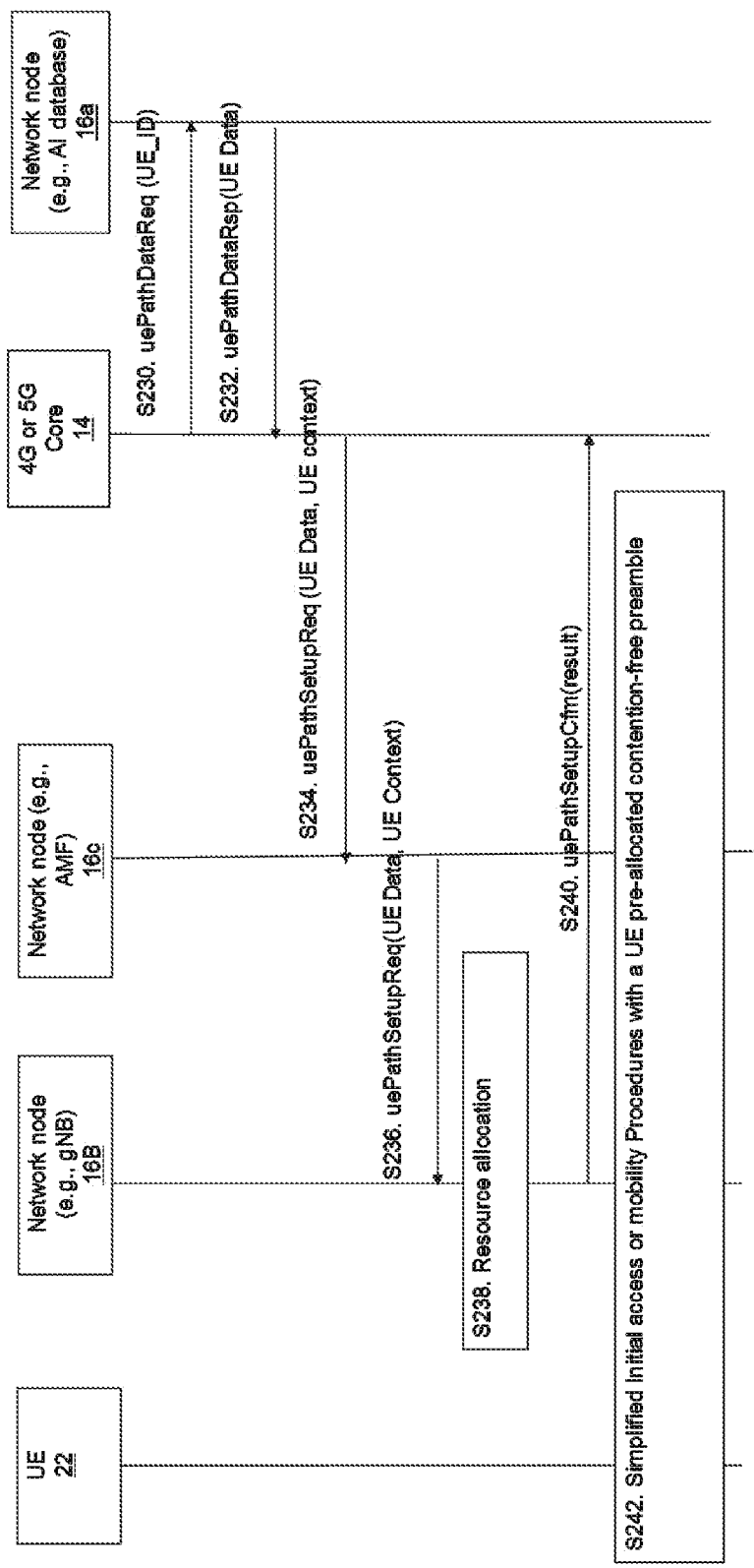
FIG. 10 is a flow diagram illustrating an example of UE path setup initiated by the network according to one embodiment of the present disclosure.

FIG. 10 illustrates an example process for UE 22 path resource pre-allocation for optimized mobility procedures according to another embodiment of the present disclosure (network-initiated). In Block S230, a request for the predicted UE 22 path may be sent to the core network node 16*a*. In Block S232, the core network node 16*a* may send a response including the UE 22 predicted path data. In Block S234, a UE 22 path setup request may be sent to the mobility network node 16*c* (e.g., MME, AMF, etc.). The request may include the UE 22 predicted path data, as well as, UE 22 context information. In Block S236, based on the UE 22 predicted path data, the mobility network node 16*c* may identify the network node 16*b* (e.g., gNB) of the target cell (at which the UE 22 is predicted to move to) and send the UE 22 predicted path data and UE 22 context information to the identified network node 16*b* (e.g., gNB). In Block S238, the network node 16*b* of the target cell may allocate or pre-allocate resources for the UE 22 indicated in the request. In Block S240, the network node 16*b* of the target cell may report the UE 22 path setup result to the core 14. In Block S242, the UE 22 may perform initial access or mobility procedures to attach to the network node 16*b* of the target cell using the allocated or pre-allocated resources e.g., pre-allocated contention-free preamble (which may be stored in persistent memory at the UE 22).

b. UE Service Requirement Predictions

Service requirement predictions for the UE 22 may also be determined based on UE 22 data collected according to the techniques in the present disclosure. In some embodiments, resources may be pre-allocated for expected services. For example, transport bearers can be pre-allocated between network nodes 16 (e.g., gNBs) and gateways based on expected services.

c. Cell Resource Prediction

In some embodiments, a TDD pattern to be used by the network node 16 for a cell may be selected based on predictions, as discussed herein above in more detail. In some embodiments, numerology and slot type (which may be based on numerology) may also be selected based on predictions made.

d. Paging: UE Location Prediction

In some embodiments, the UE 22 location tracking and prediction discussed herein may be used for paging purposes. For example, when there is a paging request for the UE 22, the location of the UE 22 may be unknown to the network. When such a use case occurs, existing network procedures for attempting to locate the UE 22 are relatively inefficient and generally includes searching each cell in a long list of potential cells. In some embodiments of the present disclosure, UE 22 location information collected according to the techniques disclosed herein may be used to more efficiently locate the UE 22. For example, in some embodiments, when there is a paging request for the UE 22, the location of the UE 22 may be predicted based on previously collected data and time information, such as, for example, the dates the UE 22 is served by cells and corresponding network nodes 16 (e.g., gNB), the day and time of the week and the year, any special events programmed at the UE 22 location, etc. The UE 22 location information may include the expected/predicted RAN/MME for the UU 22, the expected/predicted network node 16 (e.g., base station) and cell, and the expected/predicted position coordinates for the UE 22 if available. This information may complement the data which the paging procedures normally use for locating the UE 22, such as the last tracking area reported by the UE 22 while in idle mode, and/or the RAN notification area (RNA) when the UE 22 is in Inactive state.

UE Paging Request

In some embodiments, there may be a modification to e.g., the 3GPP Technical Specification (TS) 38.413, version 15, regarding UE paging requests, such as, for example, as shown in Table 1 below to associate the existing paging request signaling with the new probabilities that are computed to predict the cell(s) that the UE 22 can be found at during any time based on e.g., user habits (past statistics, historical data collected, etc.).

For example, from TS 38.413 version 15 (see Table 1 below), the recommended cells for paging are signaled from the network to the radio access network (RAN), e.g., network node 16. The recommended cells are separated into "visited cells" and "non-visited cells".

TABLE 1

Recommended Cells for Paging.

| IE/Group Name | Presence | Range | IE type and reference | Semantics description |
|---|---|---|---|---|
| Recommended Cell List | | 1 | | |
| >Recommended Cell Item | | 1 ... <maxnoofRecommendedCells> | | Includes visited and non-visited cells, where visited cells are listed in the order the UE visited them with the most recent cell being the first in the list. Non-visited cells are included immediately after the visited cell they are associated with. |
| >>NG-RAN CGI | M | | 9.3.1.73 | |
| >>Time Stayed in Cell | O | | INTEGER (0 ... 4095) | This is included for visited cells and indicates the time a UE stayed in a cell in seconds. If the UE stays in a cell more than 4095 seconds, this IE is set to 4095. |
| >>Prediction in percentage | O | | INTEGER(0 ... 100) | Prediction in percentage indicating the probability to find the UE at the cell. |
| Range bound | | | Explanation | |
| maxnoofRecommendedCells | | | Maximum no. of recommended Cells. Value is 16. | |

Figure 7:
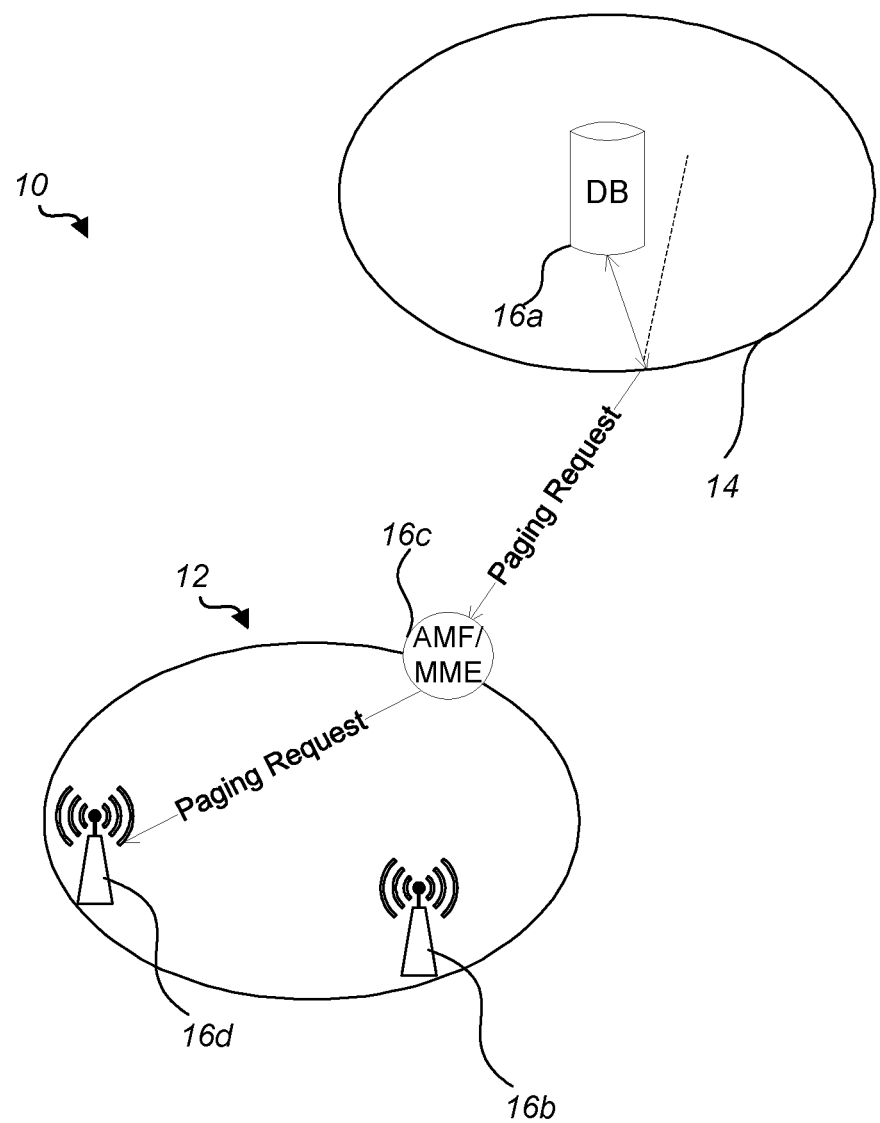
FIG. 7 is a schematic diagram illustrating an example of UE tracking according to one embodiment of the present disclosure.

Table 1 shows (see bolded part) that the prediction in percentage may be signaled as part of the recommended cells for paging. In some embodiments, the prediction in percentage may indicate the probability of finding the UE 22 at the recommended cell(s) e.g., during the current time (which corresponds to the paging request). In one embodiment (see e.g., FIG. 7), the mobility network node 16 (e.g., AMF/MME, etc.) may use the prediction information to select an order in which the recommended cells may be contacted for the paging request. For example, the network node 16 (e.g., base station) corresponding to the cell with the highest probability may be contacted first with the UE 22 paging request. The cells may be selected in order according to decreasing probability values. In other embodiments, the network node 16 may use the probability information in other ways to more efficiently page the UE 22.

Figure 11:
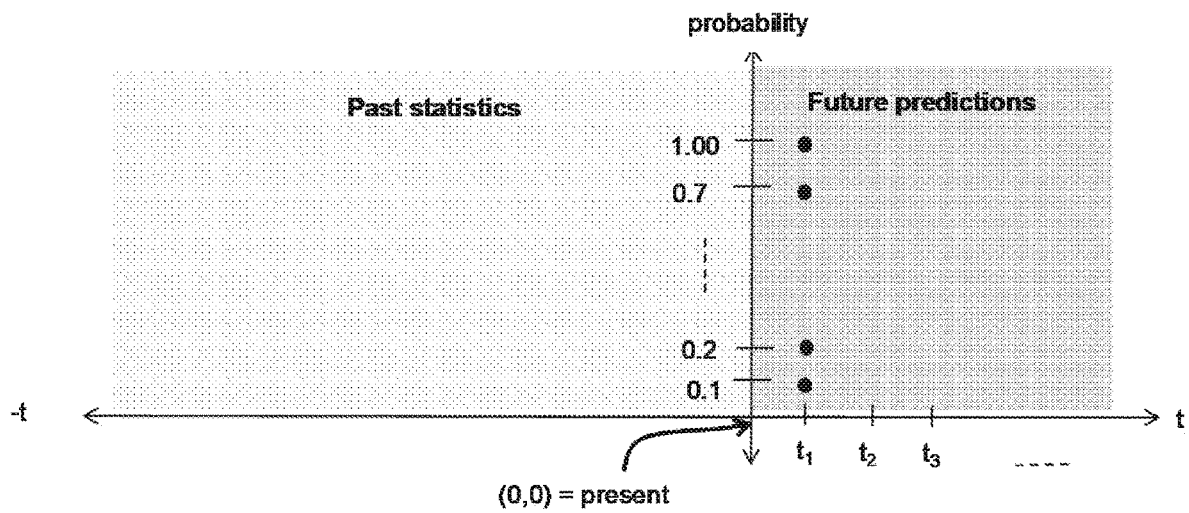
FIG. 11 is a schematic diagram illustrating an example probability and prediction for UE tracking according to one embodiment of the present disclosure.

FIG. 11 shows one example for how to predict which cell the UE 22 will be in at any given time. FIG. 11 illustrates a graph of past statistics and future predictions corresponding to the probability of a UE1 22 camping or being radio resource control (RRD) Connected to a particular cell at any given time. As can be seen in the graph in FIG. 11, example probabilities that the UE1 22 can be found at different cells (e.g., CGI a, b or d) and/or different tracking areas (TA1, 3 or 7) at any time, t1, where t can be in any time units, such as minutes, hours, days, etc. may include one or more of the following:

10% probability=(t1, 0.1)=TA1/Cell-CGI a;
20% probability=(t1, 0.2)=TA3/Cell-CGI b;
70% probability=(t1, 0.7)=TA7/Cell-CGI d; and/or
100% probability=(t1, 1.00)=0.

In some embodiments, such probabilities may be signaled along with the recommended cells for paging signaling discussed above with reference to Table 1. The probabilities may be used to select the cell(s) for paging. In some embodiments, the probabilities may be signaled and used for other types of UE 22 path prediction scenarios discussed in the present disclosure (e.g., initial attachment, mobility, resource pre-allocation, service predictions, etc.).

Figure 12:
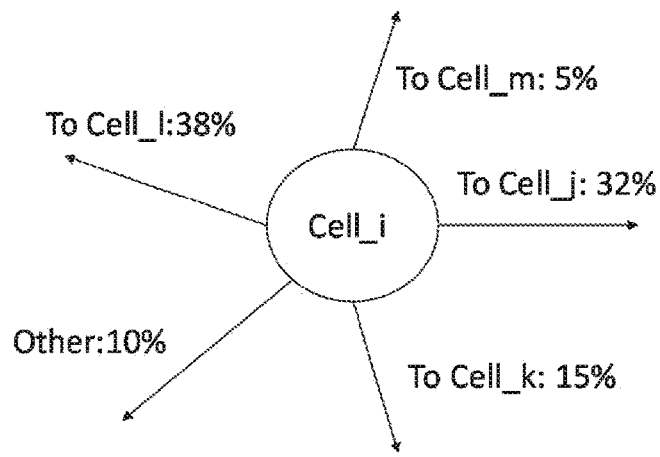
FIG. 12 is a schematic diagram illustrating an example of predicting UE mobility from cell_i according to one embodiment of the present disclosure.

FIG. 12 illustrates an example of predicting UE 22 mobility from a particular cell, cell i, to other cells at a given future time period according to one embodiment of the present disclosure. FIG. 12 shows that there is a 38 percent probability that the UE 22 will move to cell 1, a 5% probability that the UE 22 will move to cell m, a 32% probability that the UE 22 will move to cell j, a 15% probability that the UE 22 will move to cell k and a 10% probability that the UE 22 will move to yet other cells.

Figure 13:
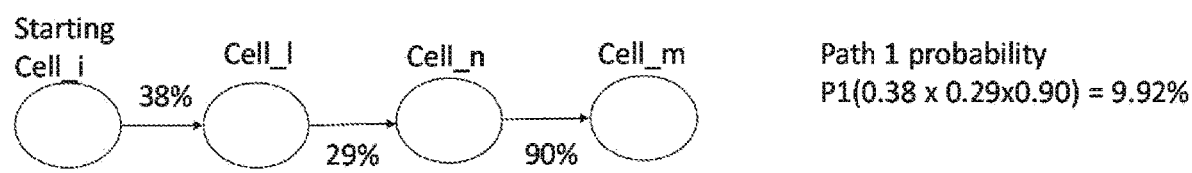
FIG. 13 is a schematic diagram illustrating an example of UE path prediction based on independent probability events according to one embodiment of the present disclosure.

FIG. 13 illustrates an example of yet another UE 22 path prediction arrangement according to some embodiments of the present disclosure. FIG. 13 illustrates an example UE 22 route prediction arrangement including a series of cells in a potential route/path. For example, given that the UE 22 is located at cell_i, the probabilities of the UE's 22 next movement and average time spent in cell_i may be used to predict the next cell that the UE 22 will move to. FIG. 13 shows an embodiment in which the UE 22 path prediction may be based on independent probability events, and, in particular, that, for example, a path 1 (including a UE path of cell i to cell 1 to cell n and to cell m) has a probability P1=0.38×0.29×0.9=9.92%.

Figure 14:
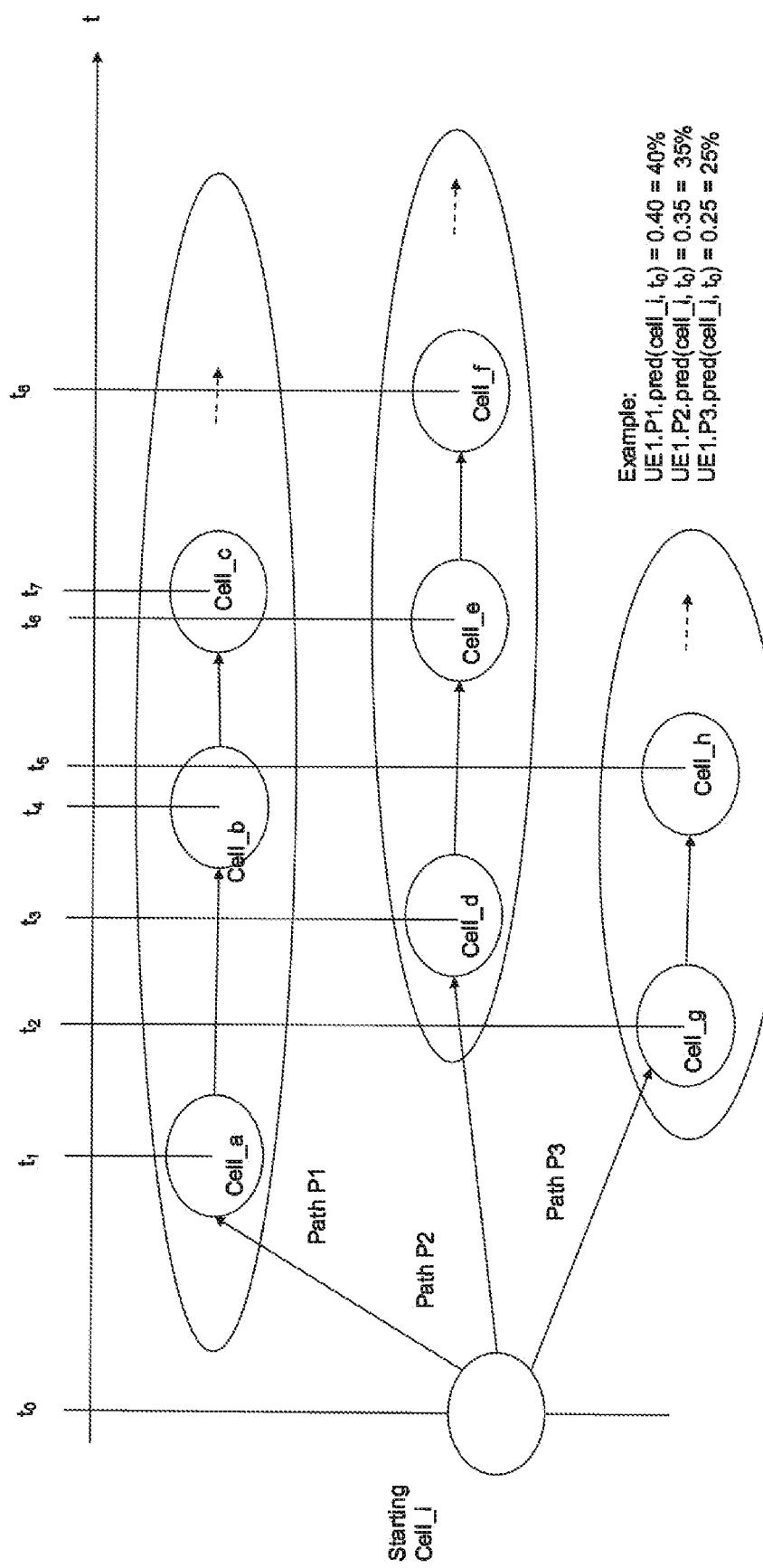
FIG. 14 is a schematic diagram illustrating an example path prediction for a UE based on user habits according to one embodiment of the present disclosure.

FIG. 14 illustrates an example path prediction for the UE 22 based on user habits. For example, complete paths can be predicted for the UE 22 based on historical data. FIG. 12 shows an example including 3 paths P1, P2, and P3, each starting the initial cell, cell i. The 3 paths for the UE1 22 from the initial cell, cell i, include the following values:

UE1.P1 (cell_i, t0).prediction=0.40=40%;
UE1.P2(cell_i, t0).prediction=0.35=35%; and
UE1.P3(cell_i, t0).prediction=0.25=25%.

Thus, each potential cell path from an initial cell may be associated with a probability value. Each potential path may be defined by the cells in the path and corresponding time periods in which the UE 22 may be expected to attach or connect to the respective cells in the path. Examples for how to define the cell path for each of potential paths P1, P2 and P3 are shown below:

UE1.P1(cell_i, t0).cells={{cell_a, t1}, {cell_b, t4}, {cell_c, t7}, ... };

UE1.P2(cell_i, t0).cells={{cell_d, t3}, {cell_e, t6}, {cell_f, t8}, ... }; and

UE1.P3(cell_i, t0).cells={{cell_g, t2}, {cell_h, t5}, ... }.

It should be noted that different paths may share some cells.

Resource Planning

Figure 15:
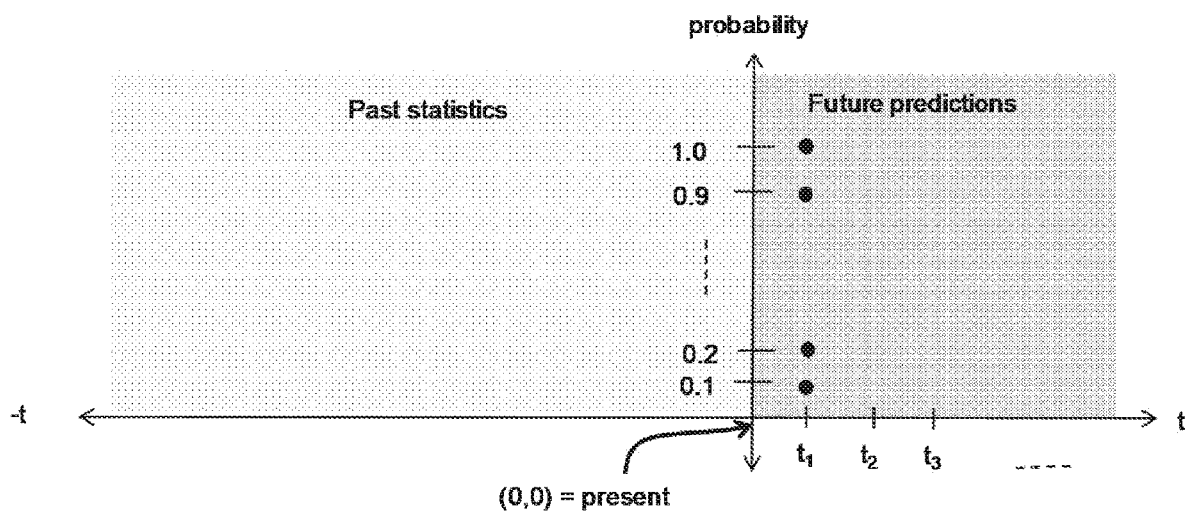
FIG. 15 is a schematic diagram illustrating an example of predictions for UE mobility from cell i to cell j according to one embodiment of the present disclosure.

In some embodiments, alternatively or additionally to the path prediction for a particular UE 22, the collected data may be used to predict overall UE activity within a cell or between cells for resource planning purposes. For example, as shown in FIG. 15, historical data is used to predict the amount of UEs 22 (e.g., 90 UEs or 25 UEs) that will move from cell i to cell j at a specific time. These estimates may assist the network in planning for resources related to UE mobility. FIG. 15 shows an example probability graph for an amount of UEs 22 that will move from cell i to cell k, which are predicted for time, t1 (where t can be in any time units, such as minutes, hours, days, etc.). The probabilities in the graph include the following values:

10% probability=(t1, 0.1)=90 UEs;
20% probability=(t1, 0.2)=70 UEs;
90% probability=(t1, 0.9)=40 UEs; and
100% probability=(t1, 1.0)=25 UEs.

Figure 16:
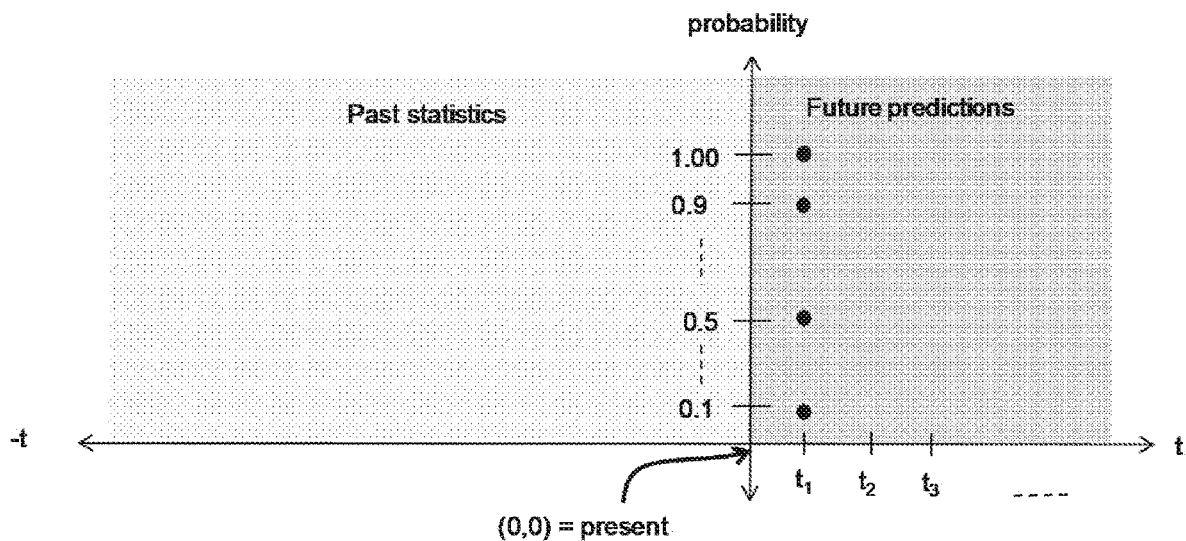
FIG. 16 is a schematic diagram illustrating an example of predicting a number of UEs in a cell according to one embodiment of the present disclosure.

FIG. 16 shows an example prediction graph representing predictions that may assist the network with cell resource planning by estimating the number of UEs 22 expected in a given cell at any given time period. FIG. 16 shows that, for time t1, there is a 10% probability that cell 1 will have 2000 UEs 22, a 50% probability that cell 1 will have 1200 UEs 22, 90% probability that cell 1 will have 800 UEs 22 and 100% probability that cell 1 will have 200 UEs 22. In some embodiments, the statistics for the number of UEs 22 may also include the average number of bearers for different services to further assist the network in resource planning, e.g., identifying the TDD pattern and/or numerology to use based on predicted uplink and downlink load and predicted quality of service requirements such as latency and throughput. For example, if the downlink direction is expected to have 50% more traffic, a TDD pattern with about 50% more downlink transmission opportunities than uplink is selected.

Data Collection Used for Resource Planning

Figure 17:
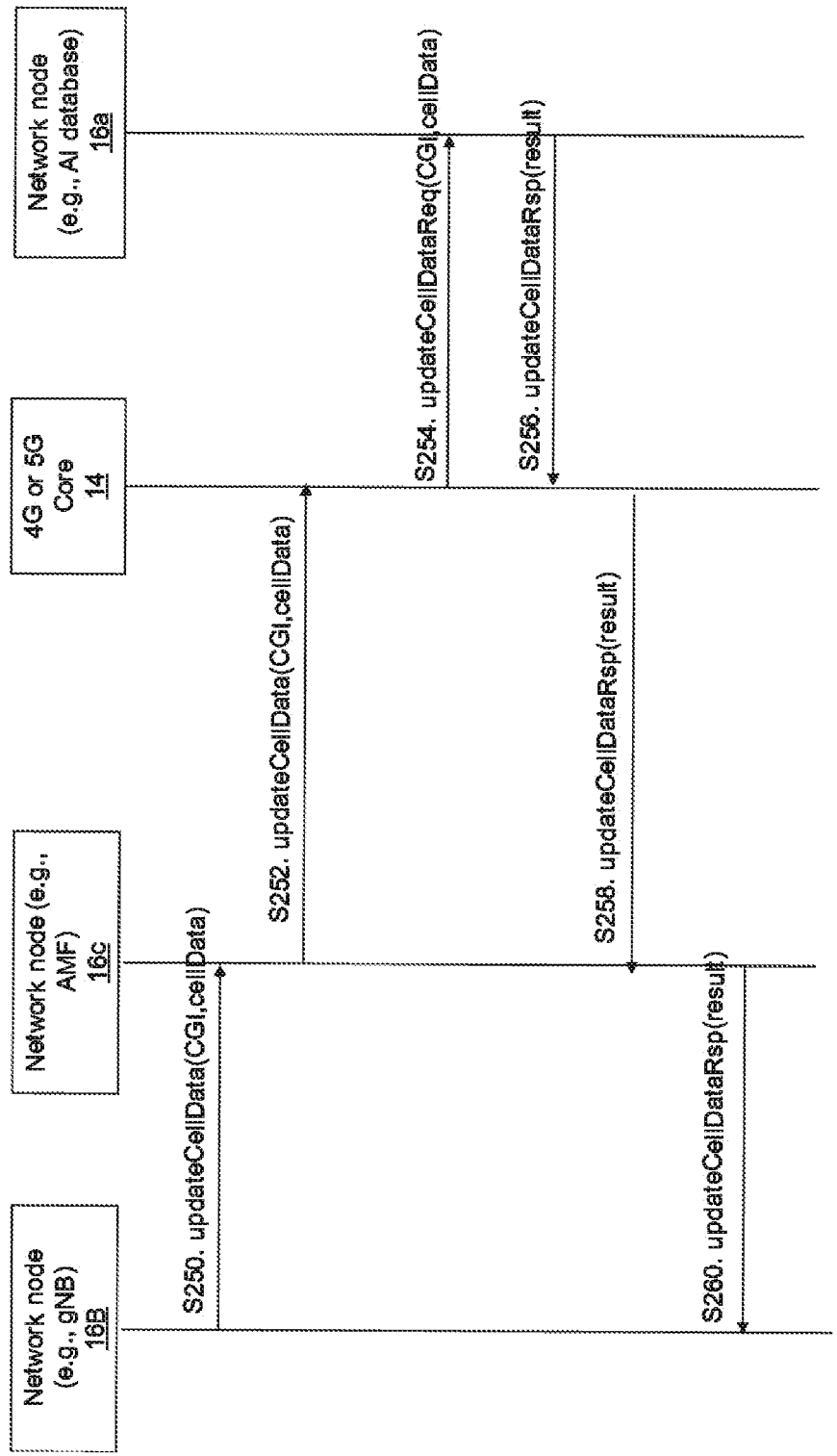
FIG. 17 is a flow diagram illustrating an example of periodic updates of cell data according to one embodiment of the present disclosure.

In some embodiments, overall cell and network node data (e.g., from multiple UEs, network nodes, etc., aggregated data, etc.) may be collected and used for various probability and prediction calculations. Statistics may be calculated, updated and/or maintained as probabilities at the core 14 (e.g., core network node 16). In some embodiments, the network node 16 (e.g., gNB) collects and forwards the data to the core 14. For example, FIG. 17 illustrates an example signaling diagram for a network node 16b (e.g., base station) sending a request, in Block S250, to update the cell's data. The request may include the cell data as well as the CGI identifying the cell corresponding to the cell data. Examples of cell data are described in more detail below. In Block S252, the mobility network node 16c may forward the request to update cell data to the core 14 and, in Block S254, the request may be received by the core network node 16a (e.g., AI database). The core network node 16a may then update the information for the cell as a result of the request and, in Block S256, return a response message, which may indicate the result (e.g., the cell data has been updated). In Block S258, the mobility network node 16c may receive the result of the cell data update and, in Block S260, the response message indicating the result may be forwarded to the network node 16b (e.g., gNB). In some embodiments, the cell data may be aggregated UE data for the cell.

Figure 18:
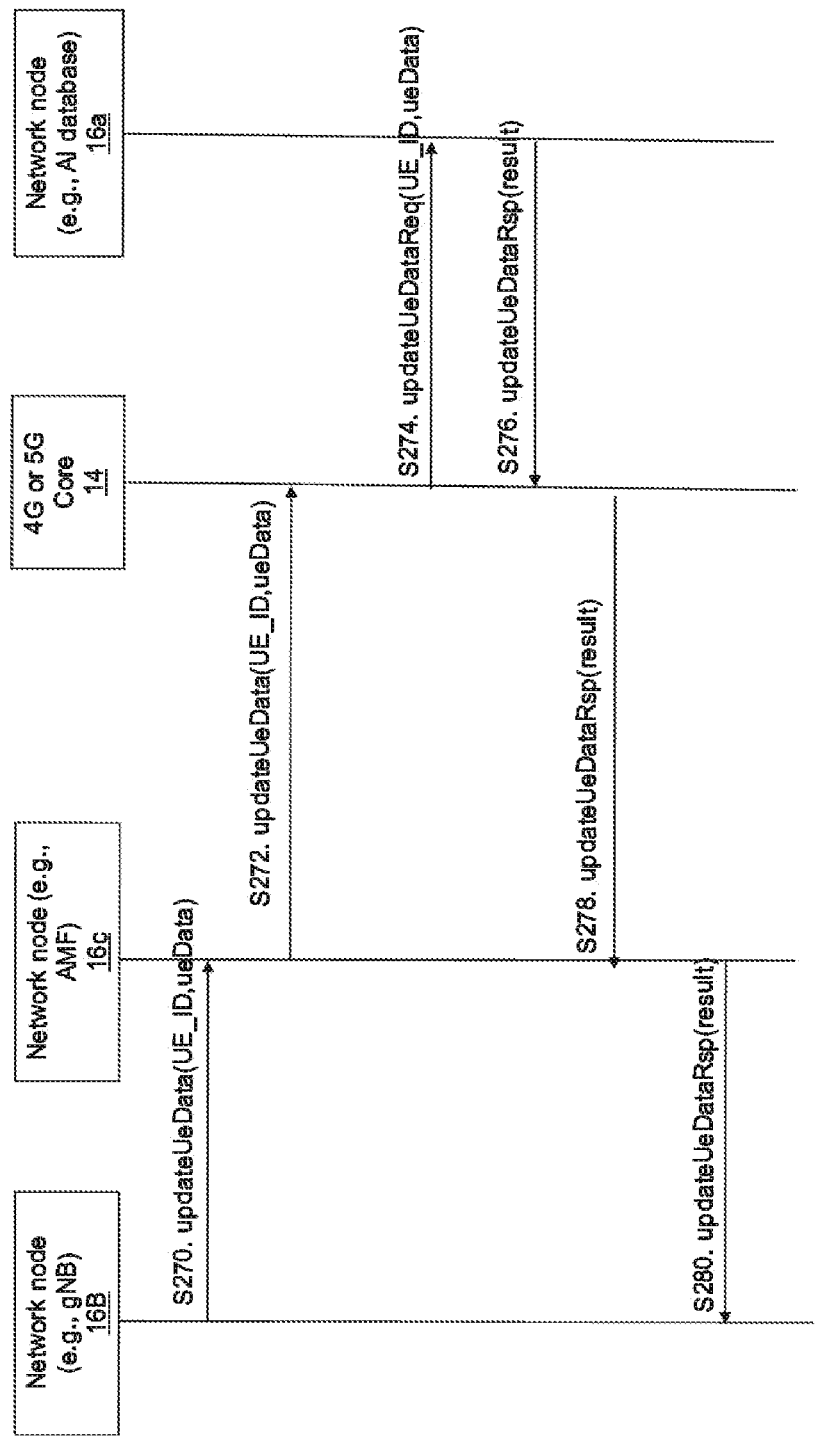
FIG. 18 is a flow diagram illustrating an example of periodic updates of UE data according to one embodiment of the present disclosure.

FIG. 18 illustrates an example signaling diagram for collecting/updating UE 22 specific data according to some embodiments. In Block S270, the network node 16b (e.g., gNB) sends a request to update the UE's 22 data. The request may include the UE 22 data as well as a UE identifier identifying the UE 22 that corresponds to the data. In Block S272, the mobility network node 16c may forward the request to update UE 22 data to the core 14 and, in Block S274, the request may be received by the core network node 16a (e.g., AI database). The core network node 16a may then update the information for the UE 22 as a result of the request and, in Block S276, return a response message, which may indicate the result (e.g., the UE 22 data has been updated). In Block S278, the mobility network node 16c may receive the result of the UE 22 data update and, in Block S280, the response message indicating the result may be forwarded to the network node 16b (e.g., gNB). Non-limiting examples of the collected/updated cell and node data include, for example:

Minimum, average, and/or maximum number of UEs 22 served by the network node 16 (e.g., gNodeB) during the period since the last update was sent;

Average number of UEs 22 served by each cell in the network node 16 (e.g., gNodeB) during the period since the last update was sent;

Minimum, average, and/or maximum number of radio bearers for different connection types (VoIP, video, best effort, MTM, etc.) in each cell of the network node 16 (e.g., gNodeB) during the period since the last update was sent;

Minimum, average, and/or maximum duration of calls for different connection types (VoIP, video, best effort, MTM, etc.) in each cell of the network node 16 (e.g., gNodeB) during the period since the last update was sent;

Minimum, average, and/or maximum number of new UEs 22 served by the network node 16 (e.g., gNodeB) during the period since the last update was sent;

Minimum, average, and/or maximum number of new UEs 22 served by each cell at the network node 16 (e.g., gNodeB) during the period since the last update was sent; and/or Minimum, average, and/or maximum resource utilization levels (since the last update) for different types of resources such as air interface bandwidth, physical resource blocks (PRBs), control channel elements (CCEs), memory, etc.

Non-limiting examples of the collected/updated UE 22 data include, for example:

The cells which have served the UE 22 while in connected state, including timestamps and duration at each cell, and the type of access (initial access, mobility, dual connectivity, etc.);

Type of services and resources, and duration for each service that the UE 22 used in this period since the last update;

Parameters recorded for a UE 22 for different connections/services such as bitrates, RF signal strength, retransmissions, etc.;

The serving and target cells for each successful move of the UE 22, and associated timestamps; and/or The statistics associated with data and, for example, for the statistics tracking the probability of the UE 22 moving from one cell to another cell (e.g., the cell1 to cell2), or for the load of a cell at any time.

Figure 19:
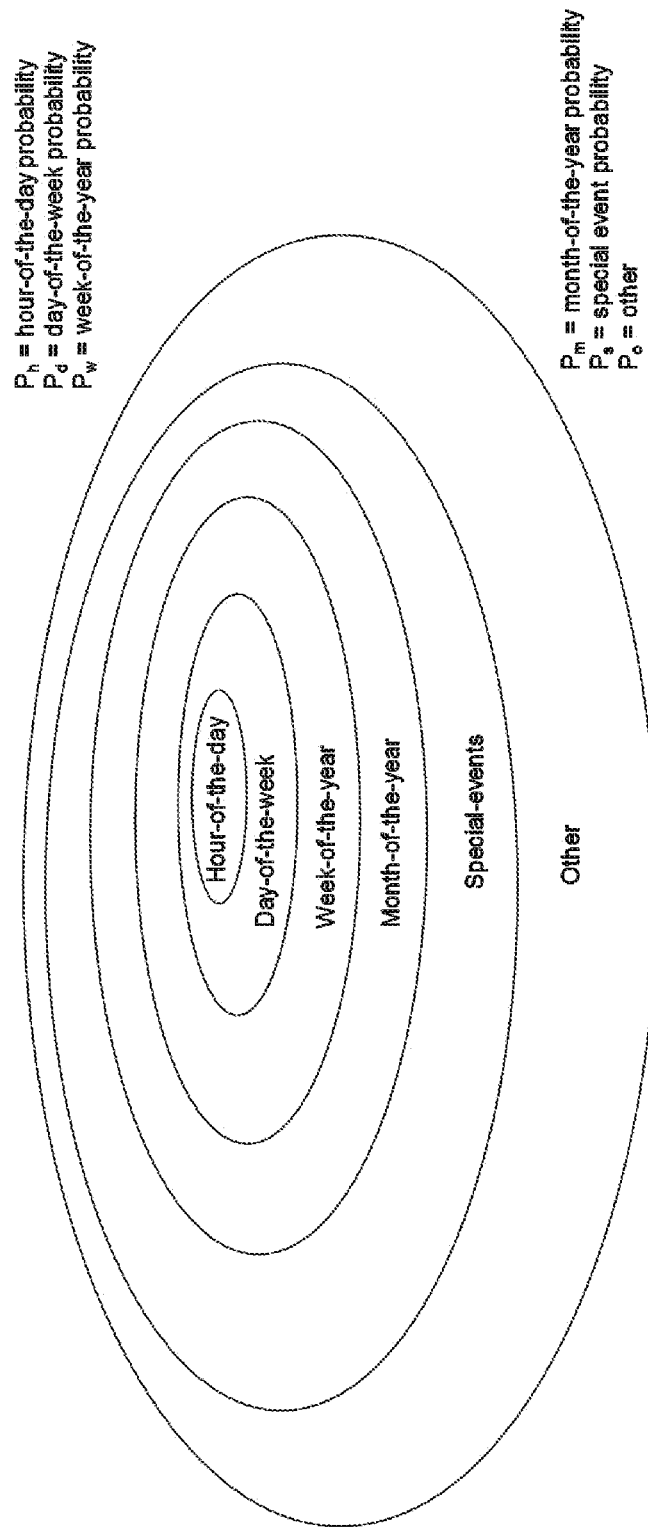
FIG. 19 is a schematic diagram illustrating an example hierarchy arrangement for past statistics according to one embodiment of the present disclosure.

As shown in FIG. 19, as an example, there may be different levels of statistics maintained, such as hour-of-the day, day-of-the-week, etc. The predictions discussed herein throughout may be calculated from the past statistics as described in more detail below. In some embodiments, the statistics may be continuously and/or periodically and/or dynamically updated. For example, the network node 16 (e.g., gNB) may send periodic updates to the core 14 and the updates may include the data collected since the last update. When an update is received (according to e.g., FIGS. 17 and 18) the received data is stored at the core network node 16*a* and the probabilities may be updated with the new data.

According to one embodiment, past statistics are used to calculate current probabilities. The following is one example formula that may be used for a prediction, $P_{pred}$:

$$P_{pred} = (w_{pred} * P_{pred}) + (w_{prob} * ((v_1 * P_h) + (v_2 * P_d) + (v_3 * P_w) + (v_4 * P_m) + (v_5 * P_s) + \ldots + (v_n * P_{other}))),$$

where the initial conditions include:

$P_{pred} = 0$,
$w_{pred} = 0$, and
$w_{prob} = 1 - w_{pred}$; and where:
$v_n$ is the weight value for a type of statistic;
$v_n$ is in range [0 . . . 1] and sum($v_1 + \ldots + v_n$)=1;
$P_{preb}$ is a prediction that a particular event will happen (e.g., any one of the various predictions discussed herein);
$w_{pred}$=weight value of the last prediction (Range: [0 . . . 1]);
$w_{prob}$=weight value of the past statistics (Range: [0 . . . 1]); and
$w_{pred} + w_{prob} = 1$.

Learning Algorithm

In some embodiments, the prediction unit 34 may use a learning algorithm to make and/or adjust the predictions based on the data collected by e.g., collection unit 32. For example, in some embodiments, the learning algorithm may include a feedback loop that is configured to adjust for inaccuracies in the prediction algorithm. The feedback loop may adjust the predictions based on at least four cases, such as, for example, one or more of the following cases.

Case 1: occurs when the last prediction for an event was correct. In this case, the future prediction is computed with a higher weight on the last prediction and lower weight on the past statistics. For case 1, the actual predicted event, $E_1$, may be calculated according to e.g., actual=$E_1$=predicted:

$$w_{pred} = w_{pred} + ((1 - w_{pred})/k),$$

where k in [0 . . . maxValueCase1] and where maxValueCase1 is a configurable positive integer and $w_{prob} = 1 - w_{pred}$.

Case 2: occurs when the last prediction for an event was not correct. In this case, the future prediction is computed with a lower weight on the last prediction and more weight on the past statistics. For case 2, the actual predicted event, $E_1$, may be calculated according to e.g., actual=$E_1$=predicted:

$$w_{pred} = w_{pred} - (w_{pred}/l),$$

where l in [0 . . . maxValueCase2] and where maxValueCase2 is a configurable positive integer and $w_{prob} = 1 - w_{pred}$.

Case 3: occurs for an event that occurs without being the one predicted. In this case, the future prediction for this event is increased by increasing the weight of the prediction on the last prediction and having a lower weight on the past statistics. For case 3, the actual predicted event, $E_1$, may be calculated according to e.g., actual=$E_1$=predicted:

$$-w_{pred} = w_{pred} + ((1 - w_{pred})/k),$$

where k in [0 . . . maxValueCase3] and where maxValueCase3 is a configurable positive integer and $w_{prob} = 1 - w_{pred}$.

Case 4: events that we not predicted and did not occur. For case 4, the actual predicted event, $E_1$, may be calculated according to e.g., actual=$E_1$=predicted:

$$w_{pred} = w_{pred} - (w_{pred}/l),$$

where l in [0 . . . maxValueCase4] and where maxValueCase4 is a configurable positive integer and $w_{prob} = 1 - w_{pred}$.

In yet other embodiments, other types of learning algorithms may be used to increase the accuracy of the predictions.

Some embodiments of the present disclosure provide arrangements for radio access network nodes (and/or related nodes) to collect data associated with different UEs and scenarios during different times of the day, different days of the year, different months, different seasons, etc. to predict future behavior in one or more of the areas discussed herein (e.g., TDD UL-DL pattern selection, aggregated resources and services, resources and services for a specific UE, UE path prediction, UE tracking and paging requests, etc.)

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a core network node, the method comprising:
    collecting location information, the collected location information associated with movement of at least one user equipment within a network;
    predicting, according to a prediction algorithm and based at least in part on the collected location information, a movement path of the at least one user equipment relative to the network, the prediction algorithm associating each of a plurality of different time windows with a different weight, the predicting according to the prediction algorithm comprising determining at least one probability based at least in part on a weighted current prediction probability value and a weighted historical probability prediction value; and
    communicating an indication of the prediction.

2. The method of claim 1, wherein the plurality of different time windows includes at least one a time of day, a day-of-the-week, a week-of-the-year, a month-of-the-year and a season, each time window associated with a different weight in the prediction algorithm.

3. The method of claim 1, wherein an outcome of a preceding prediction determines a weight value applied to the current probability prediction value and a weight value applied to the historical prediction value.

4. The method according to claim 1, wherein:
    collecting the location information further comprises:
        collecting path information and corresponding time information, the path information and the time information indicating the movement of the at least one user equipment between at least two radio network areas in the network;
    the predicting being based at least in part on the collected path information and the time information; and
    communicating the indication further comprises:
        communicating the indication of the predicted movement path of the at least one user equipment.

5. The method of claim 4, wherein the at least two radio network areas include at least two tracking areas and at least two cells.

6. The method of claim 4, wherein the indication of the predicted movement path includes at least one cell global identifier, CGI, the at least one CGI indicating at least one cell that the at least one user equipment is expected to move to according to the predicted movement path.

7. The method of claim 4, wherein the predicting further comprises:
    determining at least one probability of at least one movement path of the at least one user equipment, the at least one movement path including at least one of a cell and a neighboring cell of a base station.

8. The method of claim 4, wherein the indication of the predicted movement path is configured to be included in a paging request for the at least one user equipment, the paging request indicating, for at least one cell in the paging request, a probability prediction that the at least one user equipment is in the at least one cell.

9. A core network node configured to facilitate communication of a user equipment in a communication system, the core network node comprising processing circuitry, the processing circuitry configured to cause the core network node to:
    collect location information, the collected location information associated with movement of at least one user equipment within a network;
    predict, according to a prediction algorithm and based at least in part on the collected location information, a movement path of the at least one user equipment relative to the network, the prediction algorithm associating each of a plurality of different time windows with a different weight, the predicting according to the prediction algorithm comprising determining at least one probability based at least in part on a weighted current prediction probability value and a weighted historical probability prediction value; and
    communicate an indication of the prediction.

10. The core network node of claim 9, wherein the plurality of different time windows includes at least one a time of day, a day-of-the-week, a week-of-the-year, a month-of-the-year and a season, each time window associated with a different weight in the prediction algorithm.

11. The core network node of claim 9, wherein an outcome of a preceding prediction determines a weight value applied to the current probability prediction value and a weight value applied to the historical prediction value.

12. The core network node according to claim 9, wherein the processing circuitry is further configured to cause the core network node to:
    collect the location information by being configured to cause the core network node to:
        collect path information and corresponding time information, the path information and the time information indicating the movement of the at least one user equipment between at least two radio network areas in the network;
    the predicting being based at least in part on the collected path information and the time information; and
    communicate the indication by being configured to cause the core network node to:
        communicate the indication of the predicted movement path of the at least one user equipment.

13. The core network node of claim 12, wherein the at least two radio network areas include at least two tracking areas and at least two cells.

14. The core network node of claim 12, wherein the indication of the predicted movement path includes at least one cell global identifier, CGI, the at least one CGI indicating at least one cell that the at least one user equipment is expected to move to according to the predicted movement path.

15. The core network node of claim 12, wherein the processing circuitry is further configured to cause the core network node to predict by being configured to cause the core network node to:
    determine at least one probability of at least one movement path of the at least one user equipment, the at least one movement path including at least one of a cell and a neighboring cell of a base station.

16. The core network node of claim 12, wherein the indication of the predicted movement path is configured to be included in a paging request for the at least one user equipment, the paging request indicating, for at least one cell in the paging request, a probability prediction that the at least one user equipment is in the at least one cell.

* * * * *